US010713482B2

(12) United States Patent
Lee

(10) Patent No.: US 10,713,482 B2
(45) Date of Patent: Jul. 14, 2020

(54) METHOD AND APPARATUS FOR ANALYZING DEFINED TERMS IN A DOCUMENT

(71) Applicant: Celant Innovations, LLC, Ann Arbor, MI (US)

(72) Inventor: Jason Yoon-Ho Lee, Ann Arbor, MI (US)

(73) Assignee: Celant Innovations, LLC, Ann Arbor, MI (US)

( * ) Notice: Subject to any disclaimer, the term of this patent is extended or adjusted under 35 U.S.C. 154(b) by 150 days.

(21) Appl. No.: 15/661,796

(22) Filed: Jul. 27, 2017

(65) Prior Publication Data

US 2019/0034718 A1 Jan. 31, 2019

(51) Int. Cl.
*G06F 40/232* (2020.01)
*G06F 40/253* (2020.01)
*G06K 9/00* (2006.01)
*G06K 9/72* (2006.01)

(52) U.S. Cl.
CPC ....... *G06K 9/00456* (2013.01); *G06F 40/232* (2020.01); *G06F 40/253* (2020.01); *G06K 9/00442* (2013.01); *G06K 9/00469* (2013.01); *G06K 9/72* (2013.01)

(58) Field of Classification Search
CPC ........ G06F 17/21; G06F 17/211; G06F 17/27; G06F 17/2745; G06F 40/232; G06F 40/253; G06F 40/279
See application file for complete search history.

(56) References Cited

U.S. PATENT DOCUMENTS

| 5,649,222 | A  | * | 7/1997  | Mogilevsky | .......... | G06F 17/273 |
|           |    |   |         |            |            | 715/257     |
| 6,295,542 | B1 | * | 9/2001  | Corbin     | .....       | G06F 17/21  |
|           |    |   |         |            |            | 715/205     |
| 6,976,214 | B1 | * | 12/2005 | Bates      | ......      | G06F 17/24  |
|           |    |   |         |            |            | 715/236     |
| 7,685,514 | B1 | * | 3/2010  | Khatwani   | .........   | G06F 17/211 |
|           |    |   |         |            |            | 715/243     |
| 2003/0187886 | A1 | * | 10/2003 | Hull    | ........    | G06F 16/5846 |
| 2005/0004922 | A1 | * | 1/2005  | Zernik  | .......     | G06F 17/24  |
| 2006/0265330 | A1 | * | 11/2006 | Fukasawa | ...........  | G06F 21/6209 |
|           |    |   |         |            |            | 705/51      |

(Continued)

*Primary Examiner* — Samuel G Neway
(74) *Attorney, Agent, or Firm* — Aurora Consulting LLC; Ashley Sloat

(57) ABSTRACT

A computer-implemented method and system for identifying terms in a document in electronic form which includes: obtaining a document having title cased terms and defined terms; determining the location of each title cased term; accessing a library; comparing the title cased terms to the library of predetermined terms, wherein the title cased term is classified by a first predetermined identifier if the title cased term is not in the library, and wherein the title cased term is not classified by the first predetermined identifier if the title cased term is in the library; and determining each title cased term which is a defined term and a location and frequency of each defined term, wherein each defined term having a frequency value greater than one is reclassified by a second predetermined identifier and wherein each defined term having a frequency value of one is reclassified by a third predetermined identifier.

19 Claims, 19 Drawing Sheets
(1 of 19 Drawing Sheet(s) Filed in Color)

(56) References Cited

U.S. PATENT DOCUMENTS

| | | | |
|---|---|---|---|
| 2008/0168554 A1* | 7/2008 | Kim | G06F 21/608 726/18 |
| 2008/0201434 A1* | 8/2008 | Holmes | G06Q 10/10 709/206 |
| 2012/0328187 A1* | 12/2012 | Vuleta | G06F 17/2705 382/164 |
| 2013/0019165 A1* | 1/2013 | Whetsell | G06F 17/2241 715/249 |
| 2014/0040270 A1* | 2/2014 | O'Sullivan | G06F 17/2241 707/739 |
| 2015/0032645 A1* | 1/2015 | McKeown | G05B 13/04 705/311 |
| 2018/0260378 A1* | 9/2018 | Theodore | G06F 17/218 |
| 2019/0034718 A1* | 1/2019 | Lee | G06K 9/00456 |

* cited by examiner

FIGURE 2A g) a rate equal to 1/8 of 1% per annum of the Dollar Equivalent of the daily stated amount of such Letter of Credit, plus (y) in connection with the issuance, amendment or transfer of any such Letter of Credit or any L/C Disbursement thereunder, such Issuing Bank's customary documentary and processing fees and charges (collectively, "Issuing Bank Fees"). All L/C Participation Fees and Issuing Bank Fees that are payable on a per annum basis shall be computed on the basis of the actual number of days elapsed in a year of 360 days.

(c) The Borrower agrees to pay to the Administrative Agent, for the account of the Administrative Agent, the "Senior Facilities Administration Fee" as set forth in the Fee Letter, as may be amended, restated, supplemented or otherwise modified from time to time, at the times specified therein (the "Administrative Agent Fees").

(d) In the event that, on or prior to the date that is six months after the Closing Date, the Borrower shall (x) make a prepayment of the Term B Loans pursuant to Section 2.11(a) with the proceeds of any new or replacement tranche of long-term secured term loans that are broadly syndicated to banks and other institutional investors in financings similar to the Term Loans and have an All-in Yield that is less than the All-in Yield of such Term B Loans or (y) effect any amendment to this Agreement which reduces the All-in Yield of the Term B Loans (other than, in the case of each of clauses (x) and (y), in connection with a Qualified IPO, a Change of Control or a transformative acquisition referred to in the last sentence of this paragraph), the Borrower shall pay to the Administrative Agent, for the ratable account of each of the applicable Term Lenders, (A) in the case of clause (x), a prepayment premium of 1.00% of the aggregate principal amount of the Term Loans so prepaid and (B) in the case of clause (y), a fee equal to 1.00% of the aggregate principal amount of the applicable Term Loans for which the All-in Yield has been reduced pursuant to such amendment. Such amounts shall be due and payable on the date of such prepayment or the effective date of such amendment, as the case may be. For purposes of this Section 2.12(d), a transformative acquisition is any acquisition by the Borrower or any Subsidiary that is (i) not permitted by the terms of the Loan Documents immediately prior to the consummation of such acquisition or (ii) if permitted by the terms of the Loan Documents immediately prior to the consummation of such acquisition, would not provide the Borrower and its Subsidiaries with adequate flexibility under the Loan Documents for the continuation and/or expansion of their combined operations following such consummation, as determined by the Borrower in good faith.

(e) All Fees shall be paid on the dates due, in immediately available funds, to the Administrative Agent for distribution, if and as appropriate, among the Lenders, except that Issuing Bank Fees shall be paid directly to the applicable Issuing Banks. Once paid, none of the Fees shall be refundable under any circumstances.

Section 2.13 Interest. (a) The Loans comprising each ABR Borrowing (including each Swingline Loan) shall bear interest at the ABR plus the Applicable Margin.

(b) The Loans comprising each Eurocurrency Borrowing shall bear interest at the Adjusted LIBO Rate for the Interest Period in effect for such Borrowing plus the Applicable Margin.

(c) Notwithstanding the foregoing, if any principal of or interest on any Loan or any Fees or other amount payable by the Borrower hereunder is not paid when due, whether at stated maturity, upon acceleration or otherwise, such overdue amount shall bear interest, after as well as before judgment, at a rate per annum equal to (i) in the case of overdue principal of any Loan, 2% plus the rate otherwise applicable to such Loan as provided in the preceding clauses of this Section 2.13 or (ii) in the case of any other overdue amount, 2% plus the rate applicable to ABR Loans as provided in clause (a) of this Section; provided, that this clause (c) shall not apply to any Event of Default that has been waived by the Lenders pursuant to Section 9.08.

76

FIGURE 2B g) a rate equal to 1/8 of 1% per annum of the Dollar Equivalent of the daily stated amount of such Letter of Credit), plus (y) in connection with the issuance, amendment or transfer of any such Letter of Credit or any L/C Disbursement thereunder, such Issuing Bank's customary documentary and processing fees and charges (collectively, "Issuing Bank Fees"). L/C Participation Fees and Issuing Bank Fees that are payable on a per annum basis shall be computed on the basis of the actual number of days elapsed in a year of 360 days.

(c) Borrower agrees to pay to the Administrative Agent, for the account of the Administrative Agent, the "Senior Facilities Administration Fee" as set forth in the Fee Letter, as may be amended, restated, supplemented or otherwise modified from time to time, at the times specified therein (the "Administrative Agent Fees").

(d) the event that, on or prior to the date that is six months after the Closing Date, the Borrower shall (x) make a prepayment of the Term B Loans pursuant to Section 2.11(a) with the proceeds of any new or replacement tranche of long-term secured term loans that are broadly syndicated to banks and other institutional investors in financings similar to the Term Loans and have an All-in Yield that is less than the All-in Yield of such Term B Loans or (y) effect any amendment to this Agreement which reduces the All-in Yield of the Term B Loans (other than, in the case of each of clauses (x) and (y), in connection with a Qualified IPO, a Change of Control or a transformative acquisition referred to in the last sentence of this paragraph), the Borrower shall pay to the Administrative Agent, for the ratable account of each of the applicable Term Lenders, (A) in the case of clause (x), a prepayment premium of 1.00% of the aggregate principal amount of the Term Loans so prepaid and (B) in the case of clause (y), a fee equal to 1.00% of the aggregate principal amount of the applicable Term Loans for which the All-In Yield has been reduced pursuant to such amendment. amounts shall be due and payable on the date of such prepayment or the effective date of such amendment, as the case may be. purposes of this Section 2.12(d), a transformative acquisition is any acquisition by the Borrower or any Subsidiary that is (i) not permitted by the terms of the Loan Documents immediately prior to the consummation of such acquisition or (ii) if permitted by the terms of the Loan Documents immediately prior to the consummation of such acquisition, would not provide the Borrower and its Subsidiaries with adequate flexibility under the Loan Documents for the continuation and/or expansion of their combined operations following such consummation, as determined by the Borrower in good faith.

(e) Fees shall be paid on the dates due, in immediately available funds, to the Administrative Agent for distribution, if and as appropriate, among the Lenders, except that Issuing Bank Fees shall be paid directly to the applicable Issuing Banks. paid, none of the Fees shall be refundable under any circumstances.

Section 2.13 Interest. (a) Loans comprising each ABR Borrowing (including each Swingline Loan) shall bear interest at the ABR plus the Applicable Margin.

(b) Loans comprising each Eurocurrency Borrowing shall bear interest at the Adjusted LIBO Rate for the Interest Period in effect for such Borrowing plus the Applicable Margin.

(c) the foregoing, if any principal of or interest on any Loan or any Fees or other amount payable by the Borrower hereunder is not paid when due, whether at stated maturity, upon acceleration or otherwise, such overdue amount shall bear interest, after as well as before judgment, at a rate per annum equal to (i) in the case of overdue principal of any Loan, 2% plus the rate otherwise applicable to such Loan as provided in the preceding clauses of this Section 2.13 or (ii) in the case of any other overdue amount, 2% plus the rate applicable to ABR Loans as provided in clause (a) of this Section; provided, that this clause (c) shall not apply to any Event of Default that has been waived by the Lenders pursuant to Section 9.08.

FIGURE 2F g) a ▓▓ equal to 1/8 of 1% per annum of the ▓▓▓▓▓▓▓▓▓ of the daily stated amount of such ▓▓▓▓▓▓▓▓, plus (y) in connection with the issuance, amendment or transfer of any such ▓▓▓▓▓▓▓ or any ▓▓▓▓▓▓▓ thereunder, such ▓▓▓▓ ▓▓▓'s customary documentary and processing ▓▓▓ and ▓▓▓▓▓ (collectively, "▓▓▓▓▓▓▓▓▓"). All ▓▓▓▓▓▓▓▓▓▓▓ and ▓▓▓▓▓▓▓▓ that are payable on a per annum basis shall be computed on the basis of the actual number of days elapsed in a year of 360 days.

(c) The ▓▓▓▓▓ agrees to pay to the ▓▓▓▓▓▓▓▓▓▓▓, for the account of the ▓▓▓▓▓▓▓▓▓▓, the "▓▓▓▓ ▓▓▓▓▓▓▓▓▓▓" as set forth in the ▓▓▓▓▓▓, as may be amended, restated, supplemented or otherwise modified from time to time, at the times specified therein (the "▓▓▓▓▓▓▓▓▓▓▓▓").

(d) In the event that, on or prior to the date that is six months after the ▓▓▓▓▓▓▓▓, the ▓▓▓▓▓▓ shall (x) make a prepayment of the ▓▓▓▓▓▓▓▓ pursuant to Section 2.11(a) with the proceeds of any new or replacement tranche of long-term secured ▓▓▓▓▓▓▓ that are broadly syndicated to banks and other institutional investors in financings similar to the ▓▓▓▓▓▓ and have an ▓▓▓▓▓▓▓▓ that is less than the ▓▓▓▓▓▓▓▓ of such ▓▓▓▓▓▓▓▓ or (y) effect any amendment to this ▓▓▓▓▓▓ which reduces the ▓▓▓▓▓▓▓▓ of the ▓▓▓▓▓▓▓▓ (other than, in the case of each of clauses (x) and (y), in connection with a ▓▓▓▓▓▓▓ ▓▓, a ▓▓▓▓▓▓▓▓▓▓▓ or a transformative acquisition referred to in the last sentence of this paragraph), the ▓▓▓▓▓▓▓ shall pay to the ▓▓▓▓▓▓▓▓▓▓▓, for the ratable account of each of the applicable ▓▓▓▓ ▓▓▓▓▓▓, (A) in the case of clause (x), a prepayment premium of 1.00% of the aggregate principal amount of the ▓▓▓▓▓▓▓▓ so prepaid and (B) in the case of clause (y), a ▓▓ equal to 1.00% of the aggregate principal amount of the applicable ▓▓▓▓ ▓▓▓▓ for which the ▓▓▓▓▓▓▓▓ has been reduced pursuant to such amendment. Such amounts shall be due and payable on the date of such prepayment or the effective date of such amendment, as the case may be. For purposes of this Section 2.12(d), a transformative acquisition is any acquisition by the ▓▓▓▓▓▓▓▓ or any ▓▓▓▓▓▓▓▓ that is (i) not permitted by the terms of the ▓▓▓▓▓▓▓▓▓ immediately prior to the consummation of such acquisition or (ii) if permitted by the terms of the ▓▓▓▓▓▓▓▓▓ immediately prior to the consummation of such acquisition, would not provide the ▓▓▓▓▓▓▓ and its ▓▓▓▓▓▓▓▓ with adequate flexibility under the ▓▓▓▓▓▓▓▓▓ for the continuation and/or expansion of their combined operations following such consummation, as determined by the ▓▓▓▓▓▓▓ in good faith.

(e) All ▓▓▓ shall be paid on the dates due, in immediately available ▓▓▓▓▓, to the ▓▓▓▓▓▓▓▓▓▓▓▓ for distribution, if and as appropriate, among the ▓▓▓▓▓▓▓, except that ▓▓▓▓▓▓▓▓▓▓ shall be paid directly to the applicable ▓▓▓▓▓▓▓▓▓. Once paid, none of the ▓▓▓ shall be refundable under any circumstances.

Section 2.13 Interest. (a) The ▓▓▓▓▓ comprising each ▓▓▓▓▓▓▓▓▓▓▓ (including each ▓▓▓▓▓▓▓▓▓▓) shall bear interest at the ▓▓▓▓ plus the ▓▓▓▓▓▓▓▓▓▓▓.

(b) The ▓▓▓▓▓ comprising each ▓▓▓▓▓▓▓▓▓▓▓▓▓▓ shall bear interest at the ▓▓▓▓▓▓▓▓▓▓▓▓ for the ▓▓▓▓▓▓ in effect for such ▓▓▓▓▓▓▓ plus the ▓▓▓▓▓▓▓▓▓▓.

(c) Notwithstanding the foregoing, if any principal of or interest on any ▓▓▓▓ or any ▓▓▓ or other amount payable by the ▓▓▓▓▓▓▓▓ hereunder is not paid when due, whether at stated maturity, upon acceleration or otherwise, such overdue amount shall bear interest, after as well as before judgment, at a ▓▓▓ per annum equal to (i) in the case of overdue principal of any ▓▓▓▓, 2% plus the ▓▓▓ otherwise applicable to such ▓▓▓▓ as provided in the preceding clauses of this Section 2.13 or (ii) in the case of any other overdue amount, 2% plus the ▓▓▓ applicable to ▓▓▓▓▓▓▓▓ as provided in clause (a) of this Section; *provided*, that this clause (c) shall not apply to any ▓▓▓▓▓▓▓▓▓ that has been waived by the ▓▓▓▓▓▓ pursuant to Section 9.08.

METHOD AND APPARATUS FOR ANALYZING DEFINED TERMS IN A DOCUMENT

FIELD OF THE INVENTION

The present disclosure relates to a method and apparatus for analyzing defined terms contained in a document.

BACKGROUND OF THE INVENTION

In many complex documents, such as contracts, corporate charters, insurance policies or disclosure statements, authors of such documents utilize "defined terms" so that a concept can be described in detail once, and thereafter be easily invoked by using such defined term. Such practice promotes verbal economy by reducing redundancy, clarity of meaning by simplifying sentence structure, and amendability and portability by encapsulating the concept in a single instance. In the US, the defined terms are frequently (but not always) denoted in title case. For example, in an asset purchase agreement, the assets that are being sold and purchased may be described as "Acquired Assets." Once defined, it is easy to discuss it and assign attributes to it, such as price to be paid or the date of transfer of such Acquired Assets, without having to reiterate its description.

Although the "defined terms" are useful for the aforementioned reasons, they raise additional challenges brought forth from their usage. Since authors of such complex documents frequently assimilate provisions from a multitude of precedents, each of which may use a similar or different set of defined terms, certain portions of the document may end up with human-induced errors, including but not limited to, when: (i) a "defined term" was defined (i.e. assigned a concept), but never used in the document; or (ii) a Capitalized Term was invoked, suggesting that it was previously defined elsewhere in the document, but it was, in fact, never defined in the document. For example, "Acquired Assets" may be defined in a contract, but not used elsewhere in the document; instead, the document may use the term "Acquired Property" throughout, which is not defined. Alternatively, "Acquired Assets" may be defined, but not used; instead, a lowercased term "acquired assets" may be used in the document. One cannot be certain whether the author meant to write "Acquired Assets".

Such errors are problematic because they lower the quality of presentation of the document, and more importantly, they create ambiguity, which may result (and indeed have resulted) in litigation. Therefore, many legal professionals are trained to proofread the document to detect such problems, typically using a notepad while reading through the document to track each defined term's usage; however, this method is time consuming and subject to inevitable human error.

BRIEF SUMMARY OF THE INVENTION

The present invention broadly comprises a computer-implemented method for identifying terms in a document comprising the steps of electronically obtaining a user document having a plurality of title cased terms and a plurality of defined terms; storing the user document in a computer memory; determining, by one or more processors, the location of each title cased term; accessing a library stored in a data repository, wherein the library includes predetermined terms not to be identified by a predetermined identifier; comparing, by one or more processors, the plurality of title cased terms to the library of predetermined terms, wherein the title cased term is classified by a first predetermined identifier if the title cased term is not in the library, and wherein the title cased term is not classified by the first predetermined identifier if the title cased term is in the library; and determining, by one or more processors, each title cased term which is a defined term and a location and frequency of each defined term, wherein each defined term having a frequency value greater than one is reclassified by a second predetermined identifier and wherein each defined term having a frequency value of one is reclassified by a third predetermined identifier.

According to another aspect there is provided a method of classifying a plurality of terms in a user document comprising the steps of electronically obtaining a user document having plurality of terms; storing the user document and a plurality of terms; accessing a library stored in a data repository, wherein the library includes predetermined terms not to be identified by a predetermined identifier; comparing, by one or more processors, the plurality of terms to the library of predetermined terms; classifying with a first predetermined identifier, by one or more processors, each term that is not in the library; and one of (i) classifying or re-classifying with a second predetermined indicator, by one or more processors, each term that is a defined term and has a frequency value greater than one; and (ii) classifying or re-classifying with a third predetermined indicator, by one or more processors, each term that is a defined term and has a frequency value of one.

According to yet another aspect there is provided a method of classifying a plurality of terms in a user document comprising the steps of: electronically obtaining a user document having a plurality of title cased terms and a plurality of defined terms; storing the user document having the plurality of title cased terms and the plurality of defined terms; accessing a library stored in a data repository, wherein the library includes predetermined terms not to be identified by a predetermined identifier; comparing, by one or more processors, the plurality of title cased terms to the library of predetermined terms; classifying with a first predetermined identifier, by one or more processors, each title cased term that is not in the library; and determining each title cased term which is a defined term; and one of (i) re-classifying with a second predetermined indicator, by one or more processors, each defined term that has a frequency value greater than one; and (ii) re-classifying with a third predetermined indicator, by one or more processors, each defined term that has a frequency value of one.

In yet another aspect, there is provided a method of identifying terms in a user document comprising: receiving, by one or more processors, a user document having of a set of first words in each sentence, a set of title cased terms, and a set of defined terms; storing the user document in a computer memory; determining, by one or more processors, the location of each first word in each sentence of the stored user document, wherein each first word in each sentence is highlighted with a first color; determining, by one or more processors, the location of each title cased term in the stored user document not having the first color highlighting; accessing a library stored in a data repository that includes a set of predetermined terms not to be identified; comparing, by one or more processors, each title cased term to the set of predetermined terms to not be identified, wherein each title cased term not included in the set of predetermined terms and not highlighted with the first color is highlighted with a second color; determining, by one or more processors, each title cased term which is a defined term and the location of each defined term in the stored user document; and determining, by one or more processors, in response to determining the location of each defined term in the stored user document, a frequency value of each defined term, wherein each defined term is highlighted in a third color, and wherein each defined term having a frequency value of one is also highlighted in a fourth color.

The following will describe embodiments of the present invention, but it should be appreciated that the present invention is not limited to the described embodiments and various modifications of the invention are possible without departing from the basic principle. The scope of the present invention is therefore to be determined solely by the appended claims.

BRIEF DESCRIPTION OF THE SEVERAL VIEWS OF THE DRAWING(S)

The patent or application file contains at least one drawing executed in color. Copies of this patent or patent application publication with color drawings will be provided by the Office upon request and payment of the necessary fee.

The present disclosure will be more readily understood in view of the following description when accompanied by the below figures wherein like reference numerals represent like elements:

FIG. 2A is a screen shot of an interface for displaying a user document in a Microsoft® Word® Add-on environment, wherein the user document includes a plurality of title cased terms and a plurality of defined terms and for selecting identification criteria with ribbon buttons.

FIG. 2B is a screen shot of the interface according to FIG. 2A classifying stylistic structures in the user document with light blue highlighting.

FIG. 2C is a screen shot of the interface according to FIG. 2A classifying each first word in each sentence of the stored user document identified with dark blue highlighting.

FIG. 2D is a screen shot of the interface according to FIG. 2A classifying each title cased term that is not found in a library stored in a data repository with pink highlighting.

FIG. 2E is a screen shot of the interface according to FIG. 2A classifying each defined term having a frequency value greater than one with green highlighting and each defined term having a frequency value of one with red highlighting.

FIG. 2F is a screen shot of the interface according to FIG. 2A classifying each lowercased defined term having a defined term equivalent with yellow highlighting.

FIG. 2G is a screen shot of the interface according to FIG. 2A wherein the light blue and dark blue highlighting is removed.

FIG. 2H is a screen shot of the interface according to FIG. 2A wherein the stray pink highlighting is removed.

FIGS. 5A to 5C are screenshots of the application in an exemplary embodiment of a web application and FIG. 5D is a screenshot of an example of a completed highlighted report.

DETAILED DESCRIPTION OF THE INVENTION

Figure 1A:
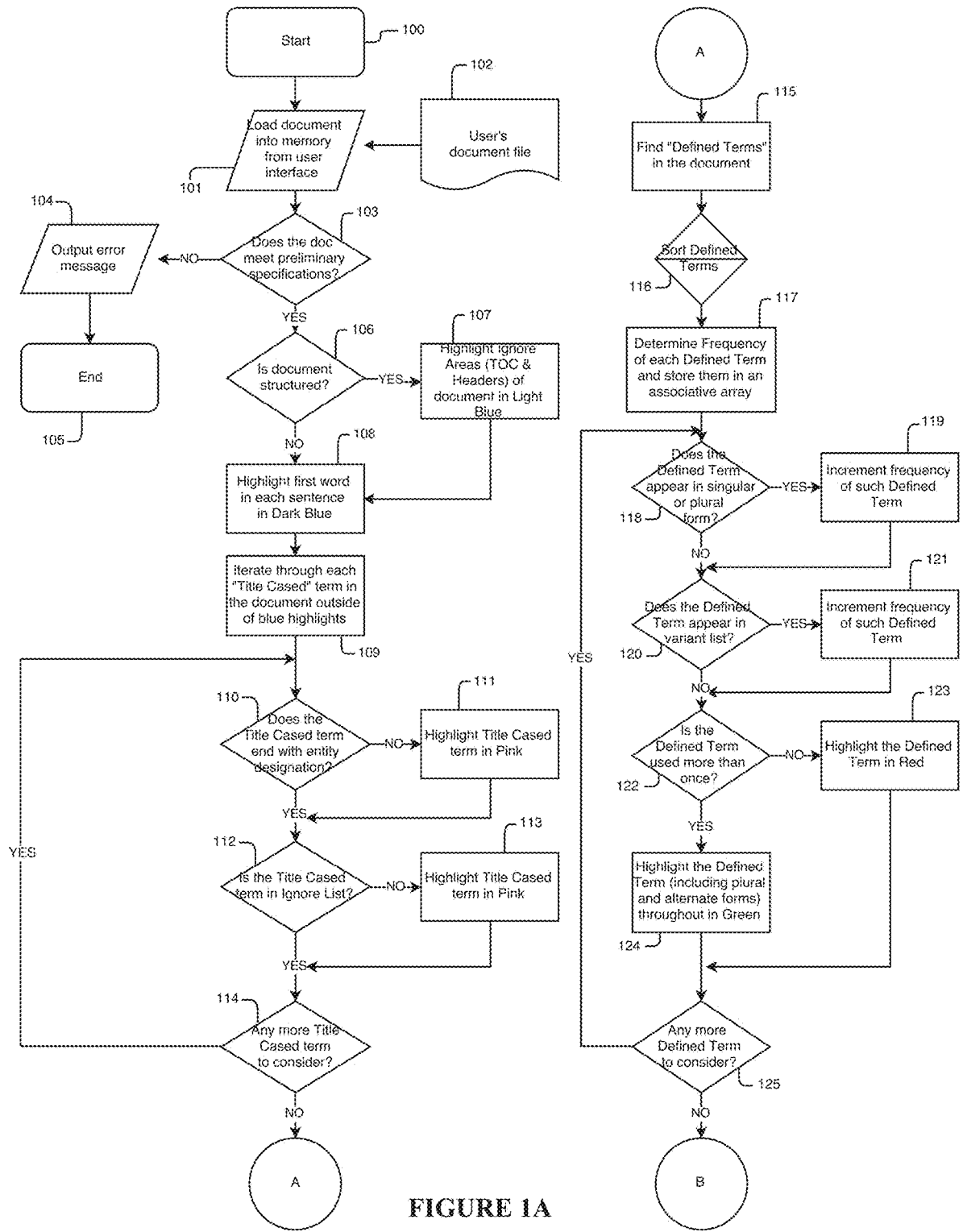
FIGS. 1A and 1B show a flowchart generally depicting the core process of the present disclosure, irrespective of the delivery form, wherein a single document is duplicated, analyzed and error related information is identified and transmitted to the user.

The present invention analyzes an input user document and automatically generates a report that identifies areas with high probability of error relating to the defined terms usage. The automatically generated report is a duplicate copy of the user's original input document, except that certain portions have been identified using predetermined identifiers. One example of predetermined identifiers is highlighting in intuitive colors to attract attention of the reviewer: (a) defined terms that are not used elsewhere in the document are highlighted in red; (b) title cased terms that are not defined in the document and not generally known to an industry practitioner (such as proper nouns, common jargons or acronyms) are highlighted in pink; (c) at the user's option, lowercased terms that have a title cased defined term equivalent are highlighted in yellow to alert the user that such lowercased term may need to be title cased; and (d) defined terms that are in fact used elsewhere in the document are highlighted in green because confirming that a defined term is used, and therefore not problematic, is nevertheless useful information.

In order for an error-checking process to be depended upon, the error checking process must maintain integrity of the original document. That is, it must not make any substantive changes to the document unbeknownst to the user, lest it detect or create errors that are not present in the original document. Therefore, highlighting of the words in the document was used as the primary means of communicating error related information to the user because such process only 'stylistically' modifies the document and does not 'substantively' modify it, providing assurances that no material alterations to the document could have been introduced during the error detection procedure. Needless to say, no metadata or hidden changes are inserted or made into the document during such procedure. Simple highlighting also has the advantage of being easily reverted back to the original form by clearing all of the highlights in one step. Although highlighting is provided as an example, it should be appreciated that other types of predetermined identifiers may be used, including, but not limited to, boldface, italics, underlining, font color changes, and combinations thereof, and these other types of identifiers are intended to be included within the spirit and scope of the invention as claimed.

The present invention utilizes regular expressions or a similar computer-based search method to capture and select certain words relating to defined terms and title cased terms in a document and automatically identifies them in a duplicate copy of the user document, which is stored in a computer memory to permit the user to quickly scan and locate errors.

Because of the modular design where the core functionality is encapsulated in a portable module, there are several exemplary embodiments, including but not limited to: (i) a downloadable standalone application; (ii) a downloadable add-on application (Add-on) to a word processing program, such as Microsoft® Word® and (iii) a non-downloadable software-as-a-service (SAAS) web application.

Figure 7:
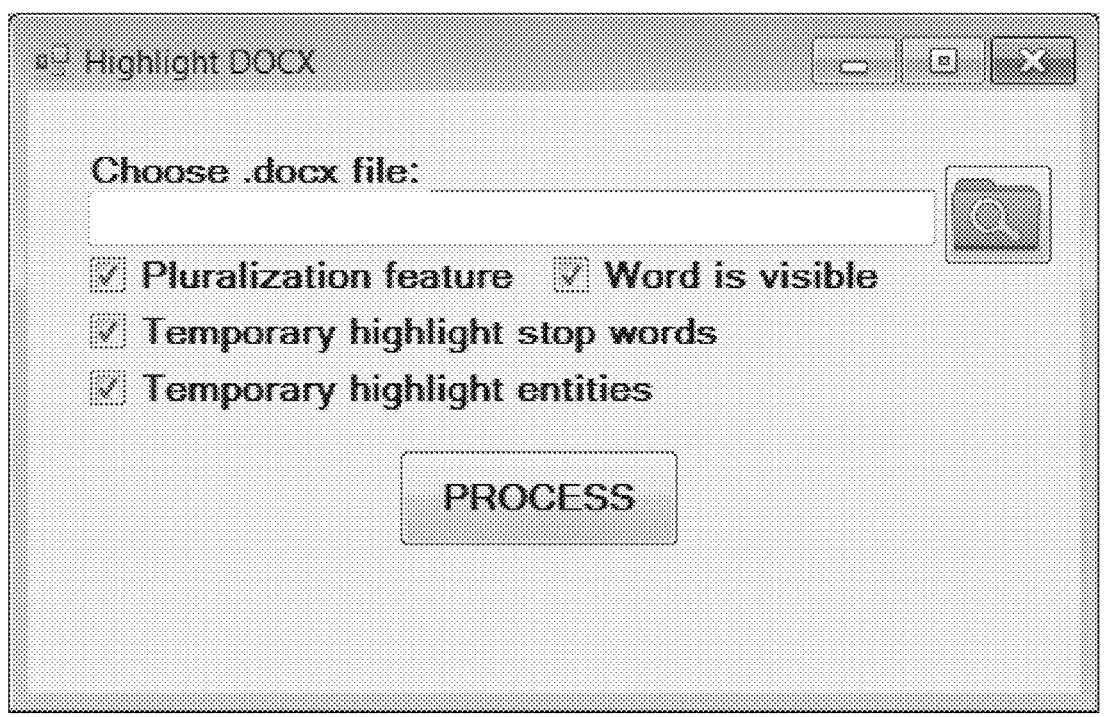
FIG. 7 is a screen shot of the application as a downloadable standalone program.

In the downloadable standalone application exemplary embodiment, the user may or may not have a graphical user interface (if no graphical user interface is used, command line interface is used) as depicted in FIG. 7. The user would select the document that would be checked and apply appropriate check-the-box options to initiate the process.

Figure 2A:
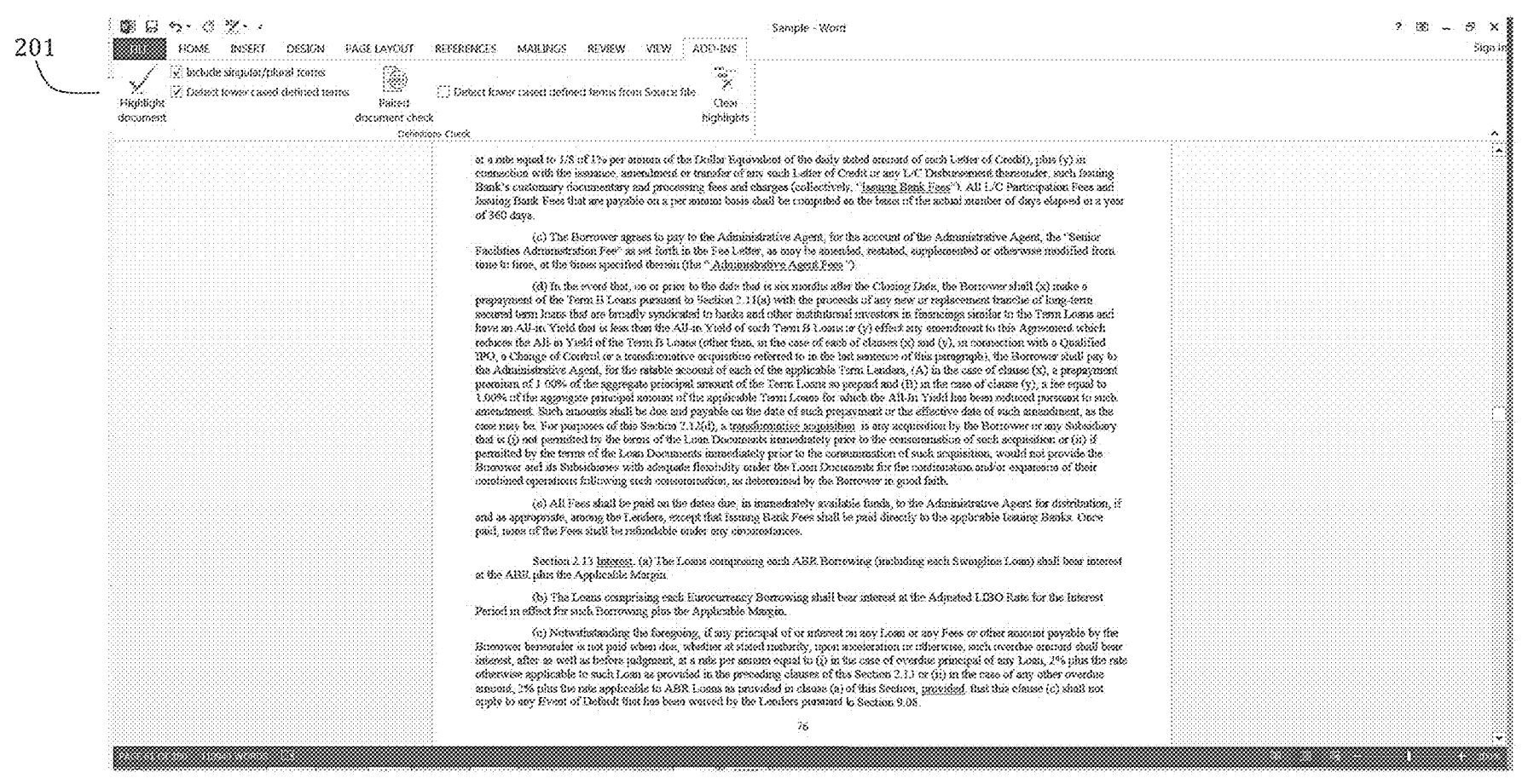

In the Add-on application exemplary embodiment, the primary interaction with the user would occur via the word processing program, as depicted in FIG. 2A, which may be initiated by the user utilizing the customized buttons, for example, ribbon buttons 201.

Figure 5A:
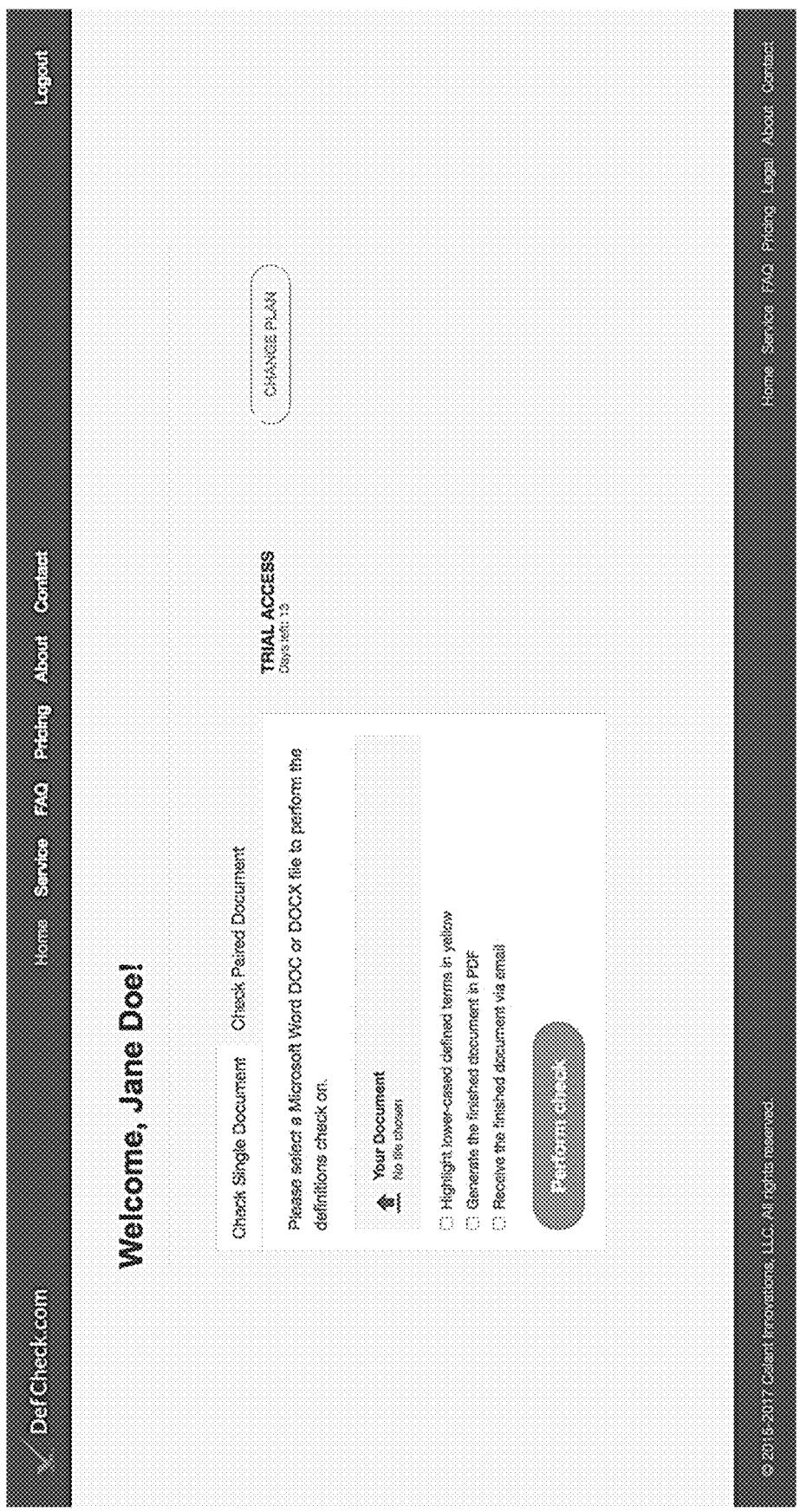
Figure 5B:
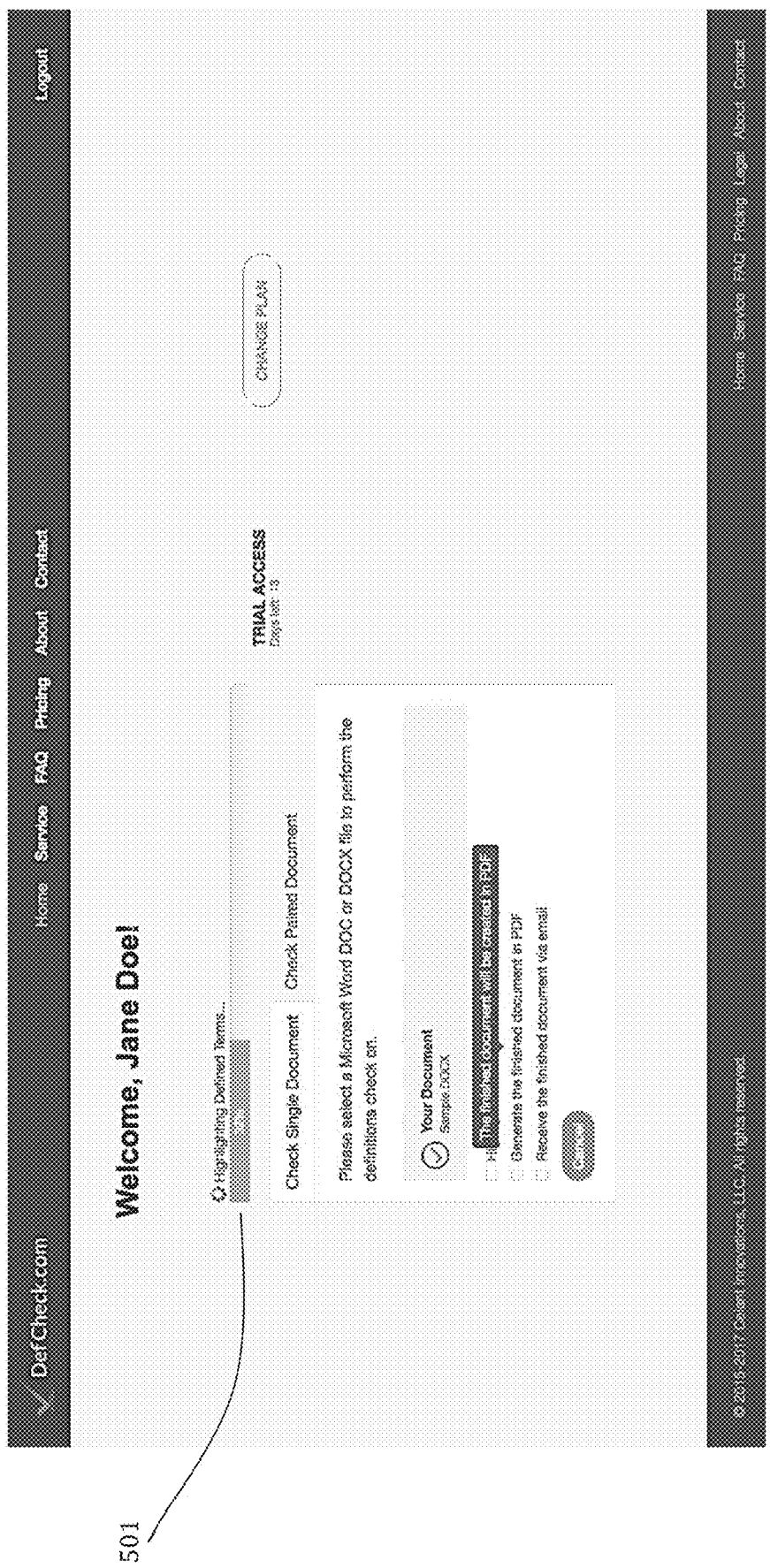
Figure 5C:
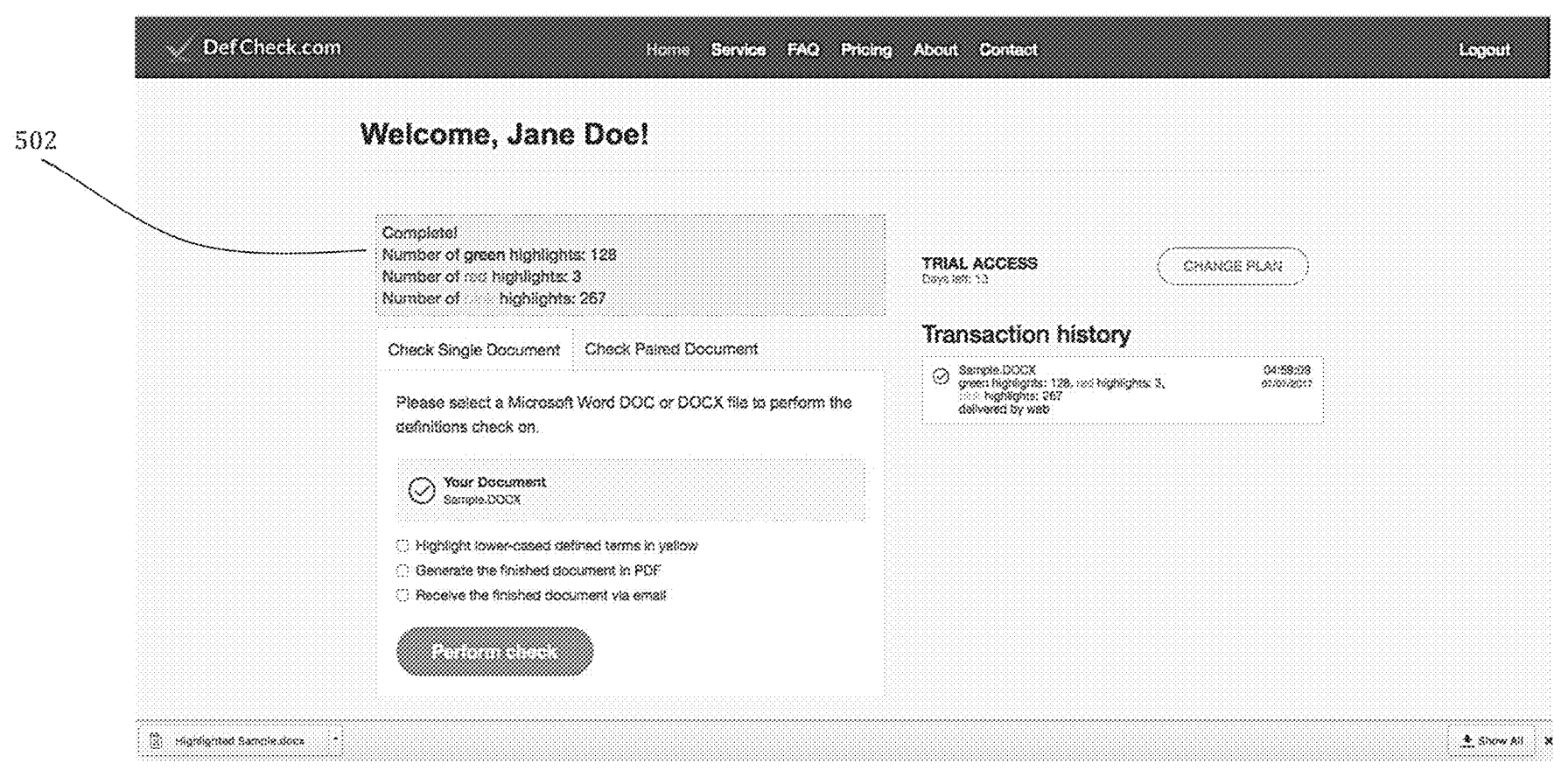
Figure 6:
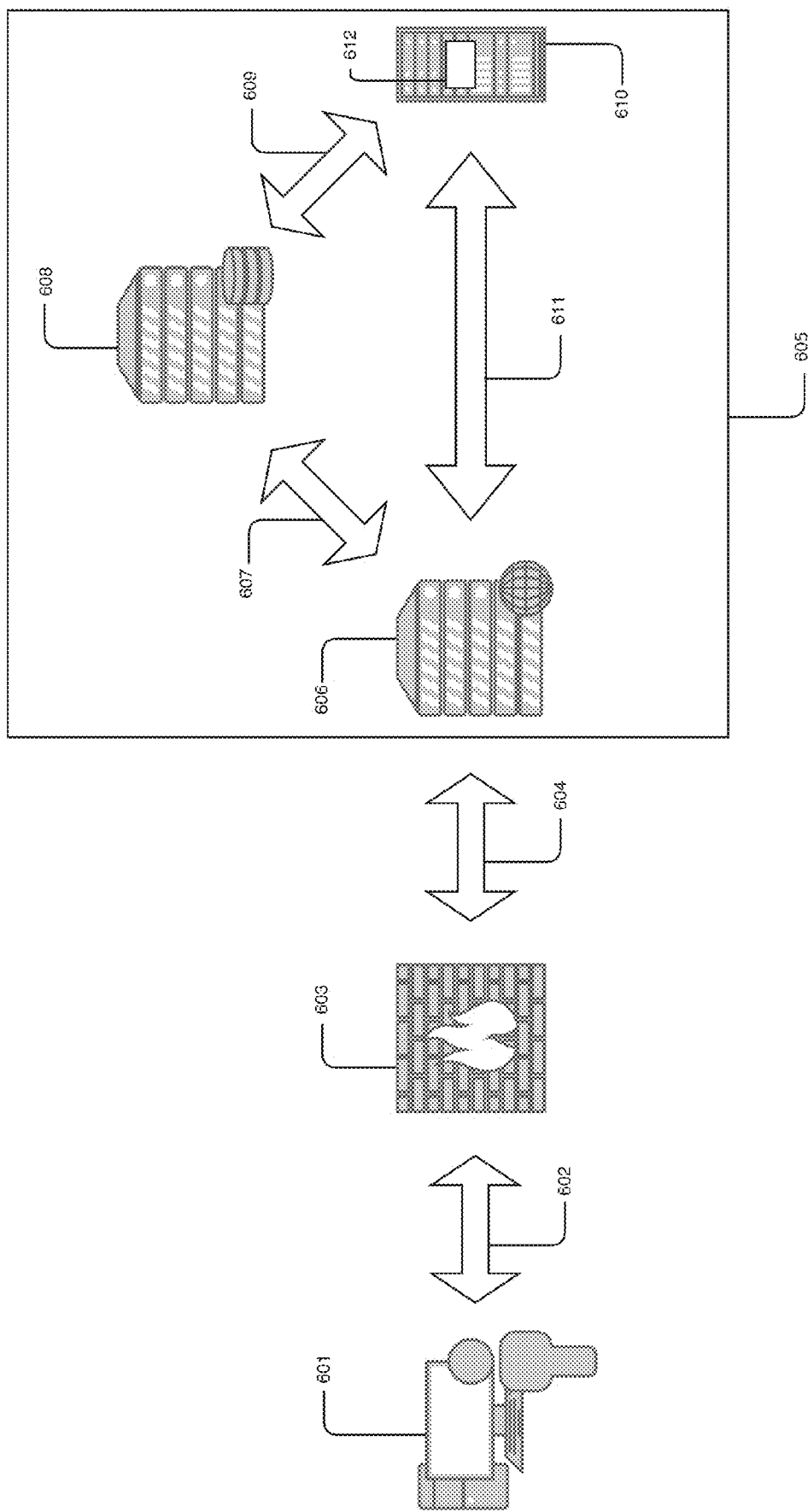
FIG. 6 is a diagram of the web application depicting the physical layout of the various server computers in relation to the user's computer.

In the non-downloadable SAAS exemplary embodiment, the primary interaction with the user would occur over the Internet or intranet via a website as diagramed in FIG. 6, with screenshots as displayed in FIGS. 5A to 5C. That is, as shown in FIG. 6, the user operates a computer 601 to remotely access a computer system 605 protected by firewall 603 via a network connection 602, which may be, for example, public wide area network (WAN), such as the Internet, a private WAN or a local area network (LAN). It should be noted that in the case of a LAN, the firewall 603 and the network connection 604 to the computer system 605 may not be necessary, since a firewall within a LAN is not customary. Although FIG. 6 does not include network routers, switches and other equipment required for network communications between each computer 601 and the components of the computer system 605, it should be appreciated that they are within the scope of this disclosure.

Specifically within FIG. 6, the computer system 605 can be further divided into three main components: the client facing web server 606, database 608, and the worker module 610. It should be noted that all of the components may be housed within a single computer, or separated out into different computers or even clusters of computers. The non-limiting example shown in FIG. 6 depicts these three components into three separate servers.

The most important component for the purpose of this invention is the processing engine or processor 612 (which may be contained in the worker computer 610 in the web application example), that (1) takes a user input document, (2) analyzes the document by comparing it to various lists, both generated from the contents of the document and independently compiled, (3) duplicates the original input document in a computer memory and applies highlights to certain words within the document in certain prescribed colors (or by applying other types of predetermined identifiers) to denote problematic areas, and (4) outputs this highlighted document to the user in a form and manner specified by the user.

Figure 1B:
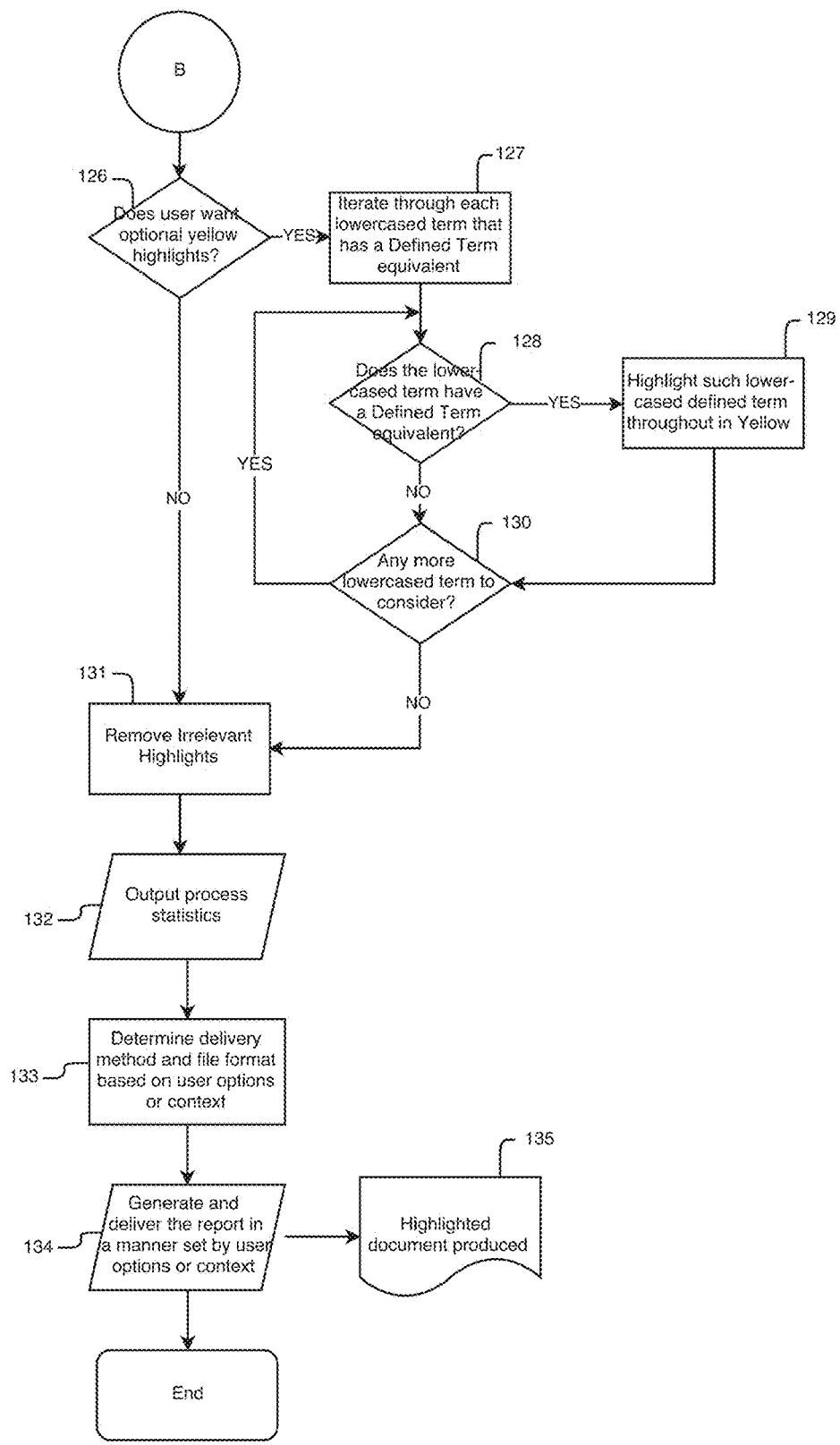

For purpose of simplifying disclosure, the present invention is described in detail, first as a core process in a flowchart in FIGS. 1A and 1B and screenshots of an add-on program in FIGS. 2A to 2H. The core process is initially described in conjunction with the add-on program screenshots because the add-on program has the added benefit of visually showing to the user the individual steps taken by the application (i.e. highlighting steps), which is intuitive to understand. Second, a variation of the core process called the paired document check is described in detail in reference to FIGS. 3A and 3B. Third, combining these elements, an exemplary embodiment of the web application context is described with references to the flowchart in FIG. 4, screenshots of the web application in FIGS. 5A to 5C and a diagram depicting physical computer servers in FIG. 6.

Core Process

To begin the core process, upon loading of the document 102 to be checked into the computer memory from user interface 101, the application performs preliminary analysis 103 of the input document 102. At block 103, it verifies, among other things, that the document meets certain acceptance criteria, for example: (1) the document to be reviewed is a word processing file, (2) the size of the document is within normal range, (3) the document contains at least one defined term, and (4) the document can be opened by the application without any problems, i.e. it is not password protected, encrypted or corrupted. If the process is unable to continue due to failure to meet any of the acceptance criteria, the process terminates with an error message at block 104.

The application then determines at block 106 whether the word processing file (DOC, DOCX, etc.) contains formatting structure, such as headers or dynamic table of contents (which are necessary to generate automatic page numbers). If the document contains such structure, the application classifies, for example, by highlighting, at block 107 all headers and table of contents in light blue, such highlight denoting the areas to be ignored when identifying title cased terms later at block 109 (i.e. pink highlighting at blocks 111 and 113). The reason why such ignore areas is designated in the first place is because headers and table of contents will frequently contain title cased words that are title cased as matter of style or formatting, not due to them being proper nouns, jargons or acronyms, which would otherwise lead them to be highlighted in pink in an over-inclusive manner. The result of this step is shown as a Microsoft® Word® Add-on exemplary embodiment in FIG. 2B showing header, denoted by reference number 205, in light blue.

Even if the document does not contain any structured data, at block 108 the first word of each sentence is highlighted in dark blue to be ignored at block 109 because such words are always capitalized. The result of this step is shown as a Microsoft® Word® Add-on exemplary embodiment in FIG. 2C, showing the first words, for example, All denoted by reference number 207, in dark blue.

Figure 2D:
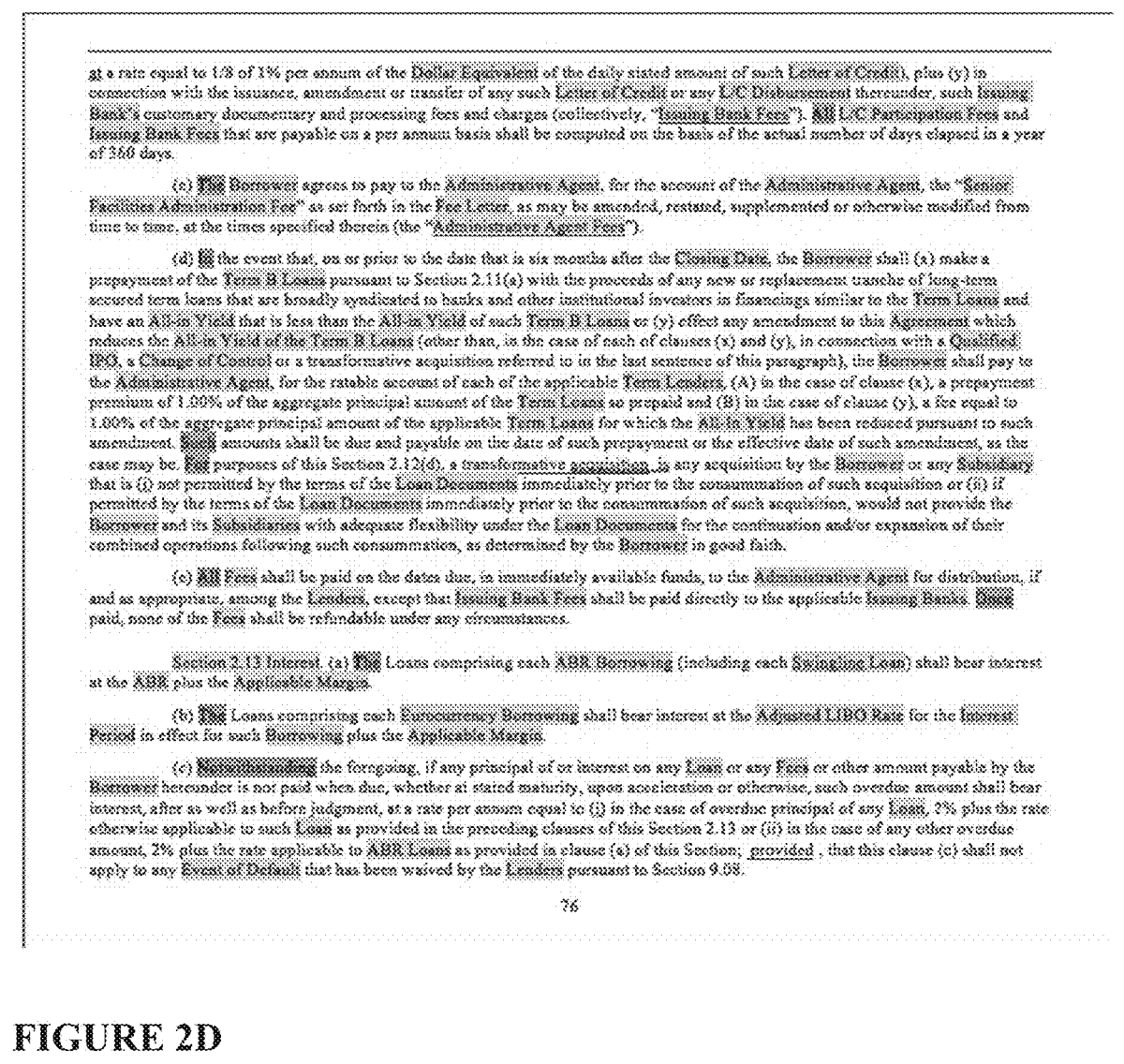

Subsequently, the application, through the iterative process 109, identifies title cased terms within the document that had not previously been highlighted in blue and checks against two lists—entities list at block 110 and ignore list at block 112—and if such term does not appear in either of the lists, the application highlights such term in pink at blocks 111 and 113, respectively. The entities list used in block 110 contains common suffix for a legal entity, such as "LLC", "Inc.", "Ltd.", etc. So if the title cased term ends with a suffix contained in the entities list, for example, "Widget Maker, Inc." then it will be identified as a legal entity name and therefore not be highlighted in pink at block 111. The ignore list used at block 112 is a library of predetermined terms which are stored in a data repository. If a title cased term appears in the library, the title cased term will not be identified by a predetermined identifier. For example, the library may include a compilation of various proper nouns, commonly capitalized terms, industry jargons and acronyms, such as "Friday", "Empire State Building", "John" and "United States Patent and Trademark Office." If a title cased term in the document appears on this list, it will not be highlighted in pink at block 113. The process repeats at block 114 until all title cased terms in document 102 have been analyzed. The result of this step is shown as a Microsoft® Word® Add-on exemplary embodiment in FIG. 2D showing, for example, the words Dollar Equivalent, denoted by reference number 209, in pink and the words, Facilities Administration Fee, denoted by reference number 211, in pink.

The application next identifies the defined terms within the document at block 115 based on a common expression. In the US, the defined terms when first introduced typically have a common expression of being enclosed in double quotes and are title cased, such as "Defined Term" or "Acquired Assets". The application identifies them using a combination of regular expressions and Boolean conditions, and the criteria can be modified to include single quotes and/or place other limitations, such as the term not exceeding 50 characters. When smart curly quotes are used, unmatched or unclosed quotation marks are ignored and therefore would not register as a defined term. In the UK, the defined terms are typically identified by using bold face and search methodology can be modified to accommodate such customary differences.

After the defined terms have been identified, they are stored in memory as a list. At block 116, the application organizes them from longest-to-shortest by character, and at block 117, counts how many times the term appears in the document. During the process at block 117, the application stores the frequency data in an associative array, containing the term and the frequency of its appearance, in a format that can be parsed by a program, such as: {"Acquired Assets": 25, "Defined Term": 2}.

It should be noted that when performing the frequency calculation, both singular form and plural form of the defined term are taken into account as described in block 118, by applying a separate function, or simply subtracting or adding "s" or "es", or modifying "y" to "ies" or vice versa to the defined term. This is necessary because defined terms are usually not defined in both singular and plural forms (although some authors do painstakingly do so). It is usually defined in either form, but not both, and not accounting for singular or plural forms would result in an under-inclusive result. As such, when a defined term is originally defined in singular form, its plural form is checked for existence in the document 102 and its existence would increment the defined term's frequency at block 119, and vice versa.

In addition to pluralization, a defined term can also appear in a different tense. To address this concern, at block 120, if a defined term appears on a variant list (a tab separated file), all of the associated terms contained in the variant list count as such defined term at block 121. For example, if the document contains a defined term "Incur", and it also appears in the variant list, which list contains tab separated words: "Incurs", "Incurred" and "Incurrence", then such other forms of the word count as the defined term during the frequency determination at block 121.

In the associative array, at block 122, a frequency of zero is not possible because in order to be included in the array in the first place, it must have existed and found to be enclosed in the quotation marks (or bold face, or another designated search parameter) at block 115. The corollary is that a frequency of 1 means that the term was found only when it was enclosed within the quotation marks (or bold face, etc.) when it was first being defined in the document 102, and identified at block 115. Therefore, a frequency of 1 also means that it is a term that was not used again in the document, and such term is classified, for example by highlighting the term in red at block 123. If the term was used more than once, then it means it was defined and used, and such term (both singular and plural forms, and its variant forms) is classified, for example, by highlighting in green at block 124, and this is iterated throughout the document at block 125 until all of the defined terms have been analyzed. The result of this step is shown as Microsoft® Word® Add-on exemplary embodiment in FIG. 2E showing, for example, the words Dollar Equivalent, denoted by reference number 209, in green, and the words Facilities Administration Fee, denoted by reference number 211 in red.

Figure 2E:
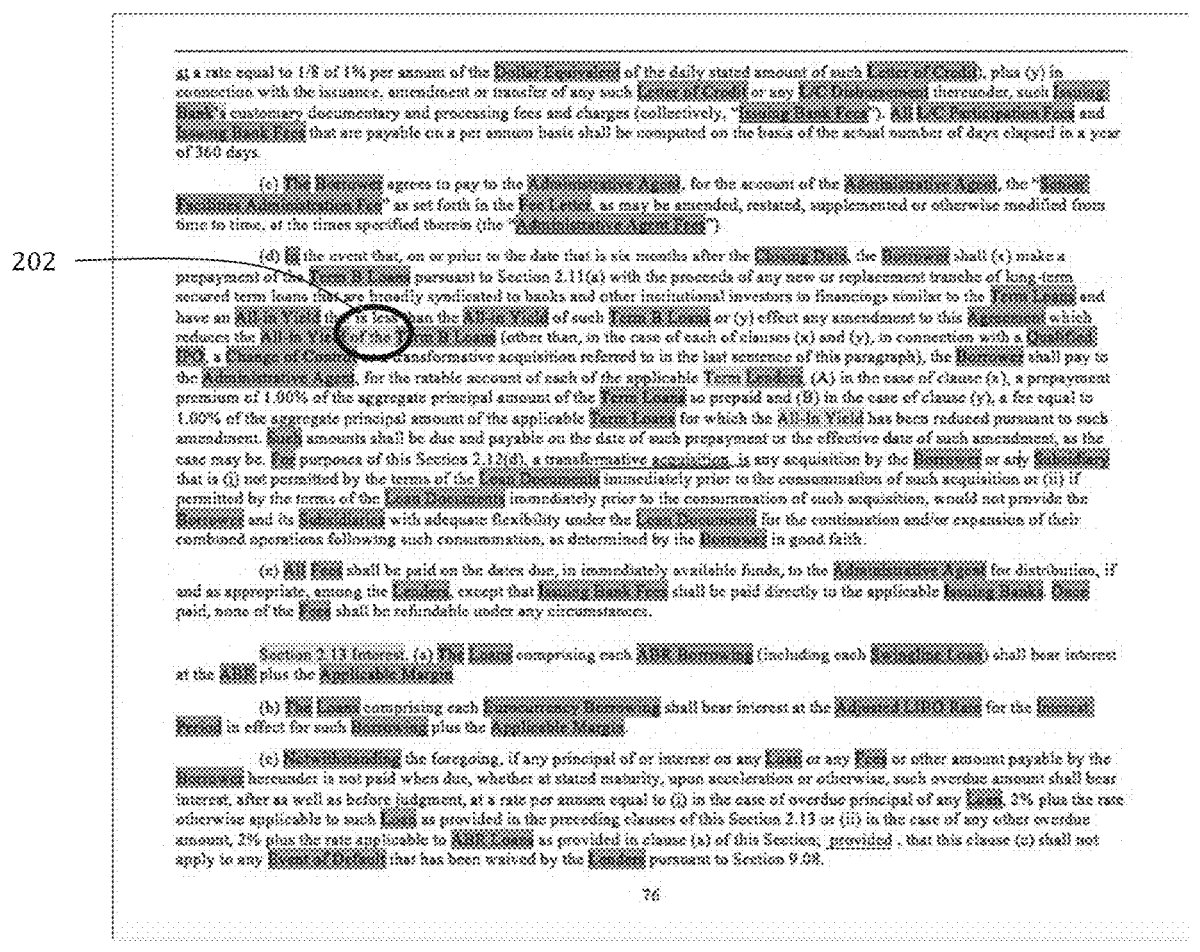

As a further clarification, the application takes a layered approach to generate the highlighted report; if the term had been previously highlighted in pink at block 111 or 113 (i.e. FIG. 2D), it simply gets irreversibly reclassified and overwritten with the new color, either green or red, at block 123 or 124 (i.e. FIG. 2E). In other words, the application locates a plurality of title cased terms and identifies those title cased terms not in the library, for example, with pink highlighting. This search is intentionally broader. The application then locates a location and determines the frequency of defined terms, which is typically a narrower category of title cased terms. Title cased terms already identified, for example, in pink, may become re-classified and identified by a different color if such title cased term is determined to be a defined term. It should be appreciated that stylistic structures and first words in the user document are not re-classified as stylistic structures and are not analyzed solely for the purposes of identifying titled cased terms (i.e. pink highlighting); however, the identified first words in each sentence may be further analyzed and, reclassified, from dark blue highlighting to either red or green highlighting, depending on the frequency of each word and whether the first word is determined to be a defined term.

Figure 2F:
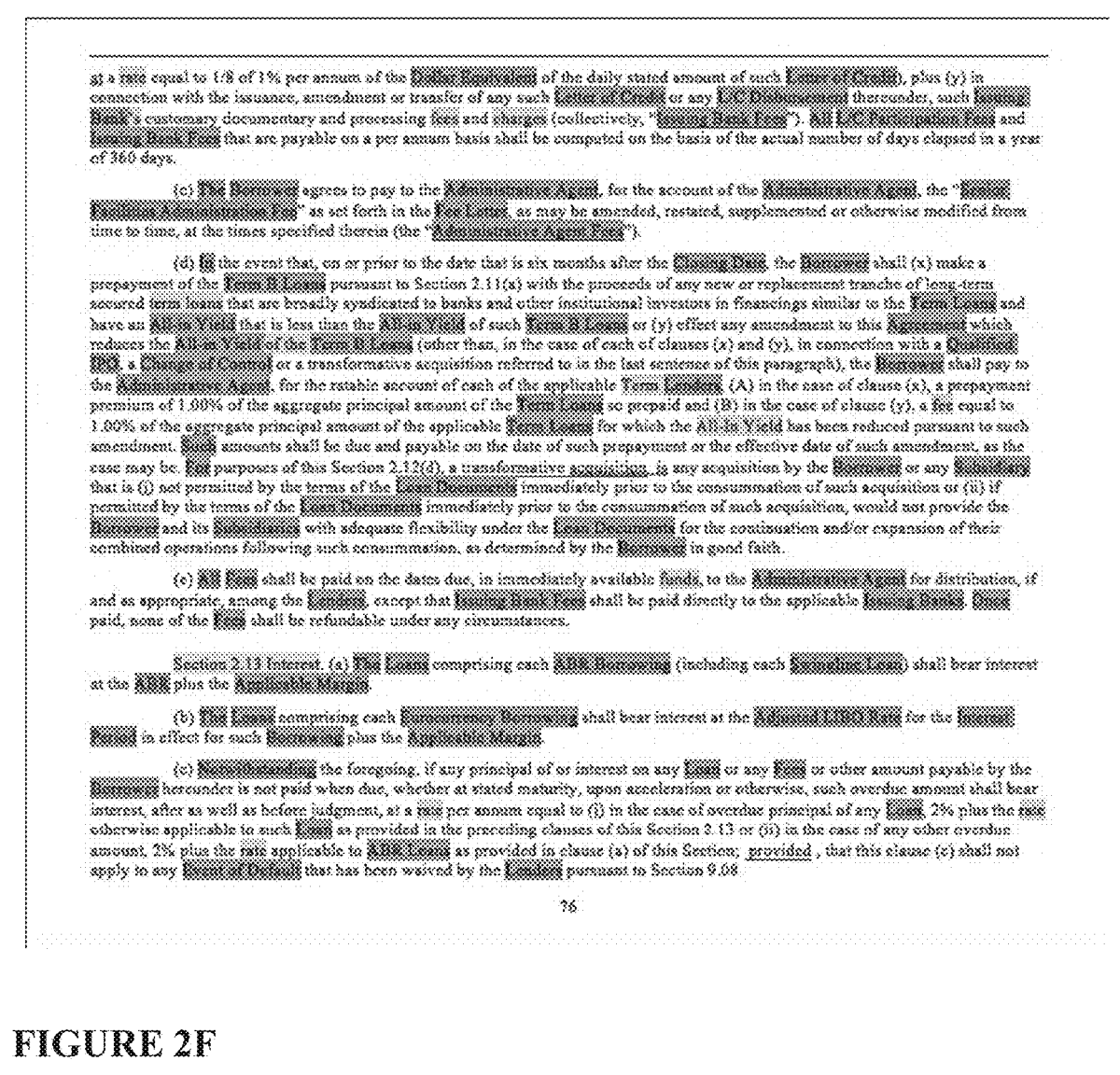

At block 126, at the user's option, the application can highlight lowercased terms that have a defined term equivalent (i.e. different only by way of casing). For example, if "Acquired Property" was found to be a defined term at block 115, when the application iterates through the document at block 127, the application will determine if a lowercased term has a Defined Term equivalent at block 128 by searching for lowered cased defined terms, and highlighting in yellow "acquired property" at block 129. At block 128, it would also take into consideration singular or plural form of these words (similar to the process performed at block 118), so it will also highlight in yellow "acquired properties" at block 129. This is helpful feature if the reviewer wants to see if any opportunity to use a defined term (which usually is a more precise term) had been missed. However, the lowercasing of the term is frequently intentional, and therefore is not necessarily an error. The result of this step is shown as Microsoft® Word® Add-on exemplary embodiment in FIG. 2F showing, for example, the words term loans, denoted by reference number 213, in yellow. The application will continue searching for lowercased terms at block 130 until all lowercased terms are located.

At block 131, the application will perform a clean-up procedure by removing irrelevant identifiers to simplify the generated report. First, it removes all of the blue highlights, both light blue and dark blue, because blue highlights performed at blocks 107 and 108 are an intermediary step for the application and they are not helpful to the end user for error-detection purposes. The result of this step is shown as Microsoft Word Add-on exemplary embodiment in FIG. 2G showing, for example, header 205, without the blue highlighting.

In addition at block 131, because the detection procedure at block 109 for pink highlighting searches for title cased terms in a more expansive way (i.e., it tries to match as much as possible given the title cased text), than the detection procedure at block 115 for the green highlighting (which is exact and precise, with only deviations being introduced from singularization/pluralization at block 118 and variant forms at block 120), there may be some remnants of pink highlights left if a longer term was highlighted in pink at block 111 or 113, and subsections of such a term were highlighted in green at block 124.

For example, the application may highlight in pink "Acquired Assets of the Company" in its entirety at block 111 or 113, because title casing includes short lowercased words such as "of", "and" and "the". And subsequently, if the application found "Acquired Assets" and the "Company" as defined terms at block 115, it would highlight them in green at block 124, leaving "of the" portion in pink. A similar example is shown in FIG. 2E at 202. At block 131, the application clears such stray lowercased pink highlights (usually located in between green highlights) as a clean-up procedure, to remove distractions for the user. The result of this step is shown as Microsoft® Word® Add-on exemplary embodiment in FIG. 2H.

Figure 2H:
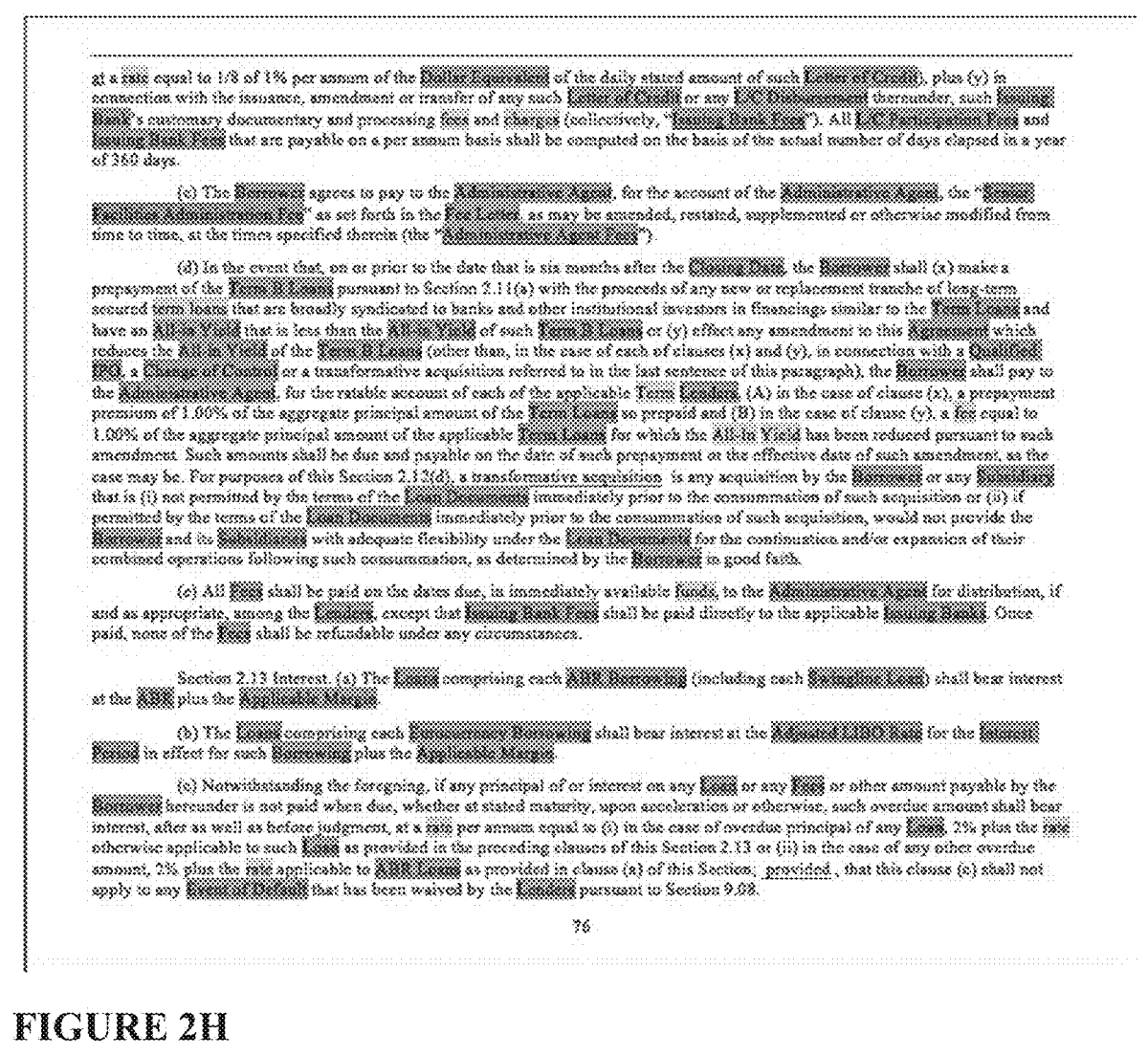

At block 132, the application will output relevant statistics relating to the check such as the number of highlights, and then make the highlighted document available to the user as specified by the user or inferable from context (as determined by the selected process) Microsoft® Word® DOCX file or Adobe® PDF file, either as download or via email attachment at blocks 133 and 134. When the highlighted document is generated at block 135, watermark and other property attributes may be added for marketing purposes or otherwise. An example of the final output 215 is shown in FIG. 2H.

Paired Document Check

Many complex documents, especially legal documents, come in sets. This is because it is useful to compartmentalize and modularize certain components of a transaction. For example, in a secured loan transaction, loan agreement and collateral agreement may be embodied in a single agreement, or more frequently, divided into separate agreements. Separation is useful if the collateral agreement is to be governed under the laws of jurisdiction different from the loan agreement. Or in the context of intellectual property security agreements, per-page fees and administrative burden stemming from the requirement to file entire agreements (and not portions thereof) prompts many practitioners to separate out intellectual property provisions onto separate intellectual property security agreements for mitigating such administrative burden.

In situations where different provisions of a transaction are housed in different agreements, it is common for the ancillary document to refer to and rely on the definitions contained in the main transaction document. Such ancillary document may contain a phrase to the effect of: "Capitalized terms used in this Ancillary Agreement and not otherwise defined herein shall have the respective meanings ascribed to them in the Main Agreement." A common example may be that of a collateral agreement relying on a credit agreement in a loan transaction, of a Fee Letter relying on the definitions contained in the Commitment Letter in a committed financing, or of a Supplemental Indenture, relying on the definitions in the Base Indenture in a securities offering.

Figure 3A:
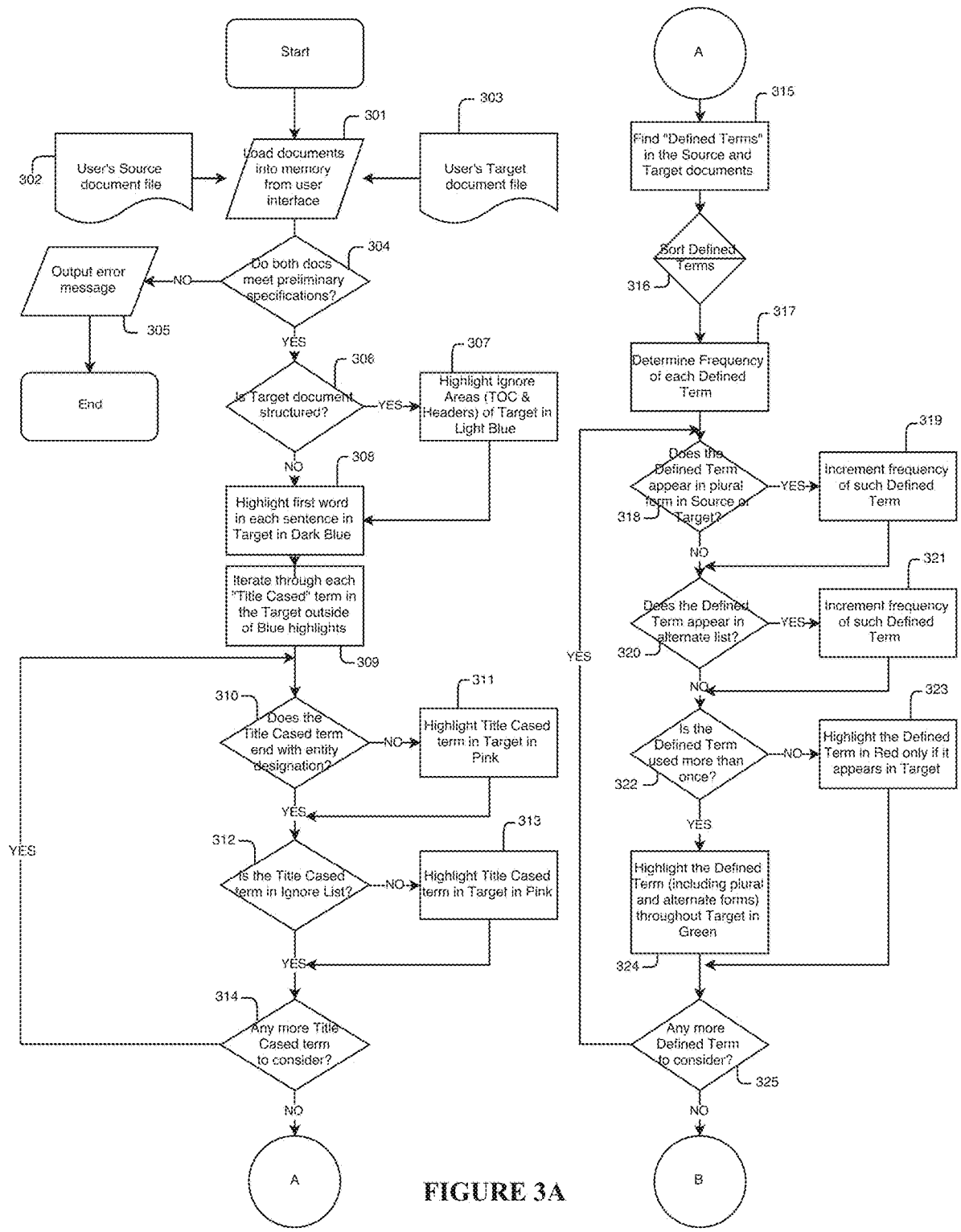
FIGS. 3A and 3B show a flowchart depicting a variation of the core process generally described herein as a paired document check, wherein a second document is introduced as additional input when performing the core process on an original document.
Figure 3B:
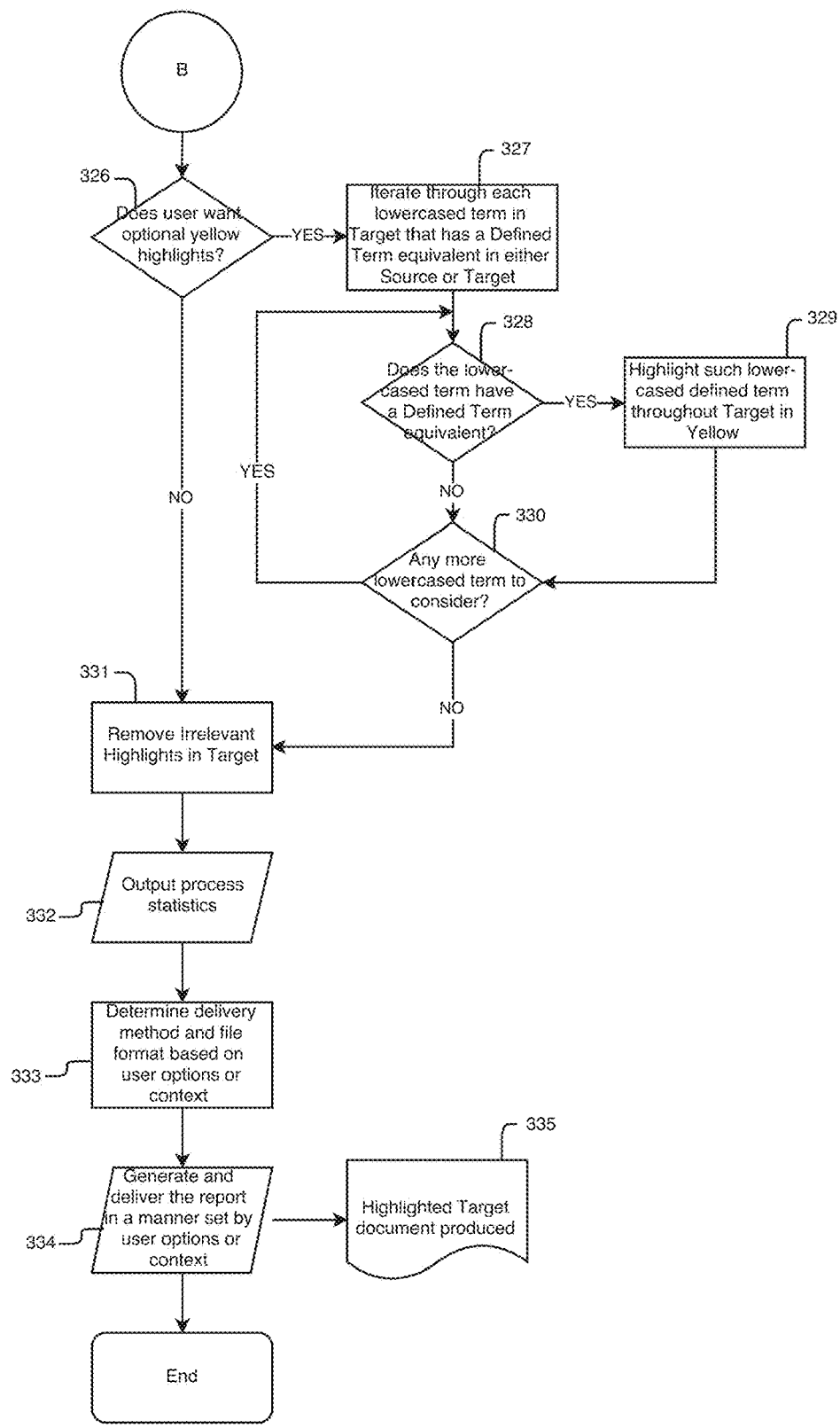

In such cases, the practitioners have had to perform error-identification procedure manually by flipping back and forth between the two documents, while they keep track of the defined term usage. The Paired Document Check in FIGS. 3A and 3B is a feature designed to address this burden. It is similar to the Core Process described above and in FIGS. 1A and 1B, except that it will analyze two documents that will be loaded onto memory at block 301, called source document 302 and target document 303, at once.

It will consider the defined terms contained in the source document 302 when performing the core process on the target document 303. In other words, source document's defined terms (both singular, plural and variant forms) will be highlighted in green in the target document 303, and generally be considered when making other highlights (such as the yellow highlight in block 328).

The target document 303 is the document that is primarily being analyzed, and its duplicate copy produced at block 334 will be the basis in which the highlighted report 335 will be based on. The source document 302 provides another input source for the purposes of analyzing the "defined terms" at block 315 since the target document 303 relies on the defined terms of the source document 302.

Upon completion of preliminary checks at block 304 that both documents meet criteria described supra with respect to block 103, the application determines whether the target document 303 contains formatting structure at block 306, and if so, highlights all headers and table of contents in light blue at block 307, similar to the process as described supra with respect to block 107. Failure to meet the criteria test at block 304 results in error at block 305 and the process is terminated. Even if the document does not contain any structured data, first word of each sentence is highlighted in dark blue to be ignored at block 308, similar to the process as described supra with respect to block 108.

Subsequently, the application, through the iterative process 309 identifies title cased terms within the target document 303 that had not previously been highlighted in blue and checks against two lists—entities list at block 310 and ignore list at block 312—and if such term does not appear in either of the lists, the application highlights such term in pink at blocks 311 and 313, respectively, a process consistent with those described supra with respect to blocks 111 and 113. It is important to note that the entities list and ignore lists apply independently to the target document 303 and therefore the source document 302 does not have any bearing on the pink highlights at blocks 311 and 313.

The application next identifies the defined terms within both the source document 302 and the target document 303 at block 315, in a process consistent with block 115. After the defined terms have been identified from both source document 302 and the target document 303, they are stored in a list and organized at block 315, and the frequency of each appearance is stored in associative array at block 317, consistent with the description set forth in the paragraph describing block 117.

It should be noted that when performing the frequency calculation, both singular form and plural form of the defined term in either source document 302 or the target document 303 are taken into account at blocks 318 and 319, as well as their variants (in a tab separated file) at blocks 320 and 321, consistent with the process described supra with respect to blocks 120 and 121.

It is important to remember that only the target document 303 is being highlighted; the source document 302 will not be highlighted or modified in any way. Therefore, if the defined term has been found to have a frequency of 1 at block 322, and it appears in the target document 303, then it will be highlighted in red at block 323. If it does not appear in the target document 303, it must have appeared in the source document 302 and is therefore not relevant. And if it appears more than once at block 322, it is only highlighted in green in the target document 303 to the extent it appears at least once in the target document 303 at block 324. This step is repeated at block 325 until all of the defined terms in both the source document 302 and the target document 303 have been analyzed.

At the user's option, at block 326, the application can highlight lowercased terms that have a defined term equivalent (i.e. different only by way of casing). When considering the defined terms, it will consider both the source document 302 and the target document 303. At block 328, it would also take into consideration singular or plural form of these words. For example, if "Acquired Property" is a defined term in the source document 302, the application will highlight in yellow "acquired properties" in the target document 303 at block 329. The process is repeated at block 330 until all of the lowercased defined terms have been analyzed.

It should be noted that the above procedure describes the default behavior of the application, and settings can be set by the user to fine-tune the program's behavior to achieve the users' requirements.

As the cleanup procedure, the application will remove all of the blue highlights inserted at blocks 307 and 308 and interim pink highlights in the target document 303 at block 331 in a process consistent with those described in the paragraphs set forth supra with respect to block 131.

At block 332, the application will output relevant statistics, and at blocks 333 and 334, make the highlighted document available to the user as Microsoft Word® DOCX file or Adobe® PDF file, either as download or via email attachment, in a process consistent with those described in paragraph set forth supra with respect to block 132, 133 and 134 respectively. When the highlighted document is generated at block 335, watermark and other property attributes may be added.

Web Application Exemplary Embodiment

Figure 4:
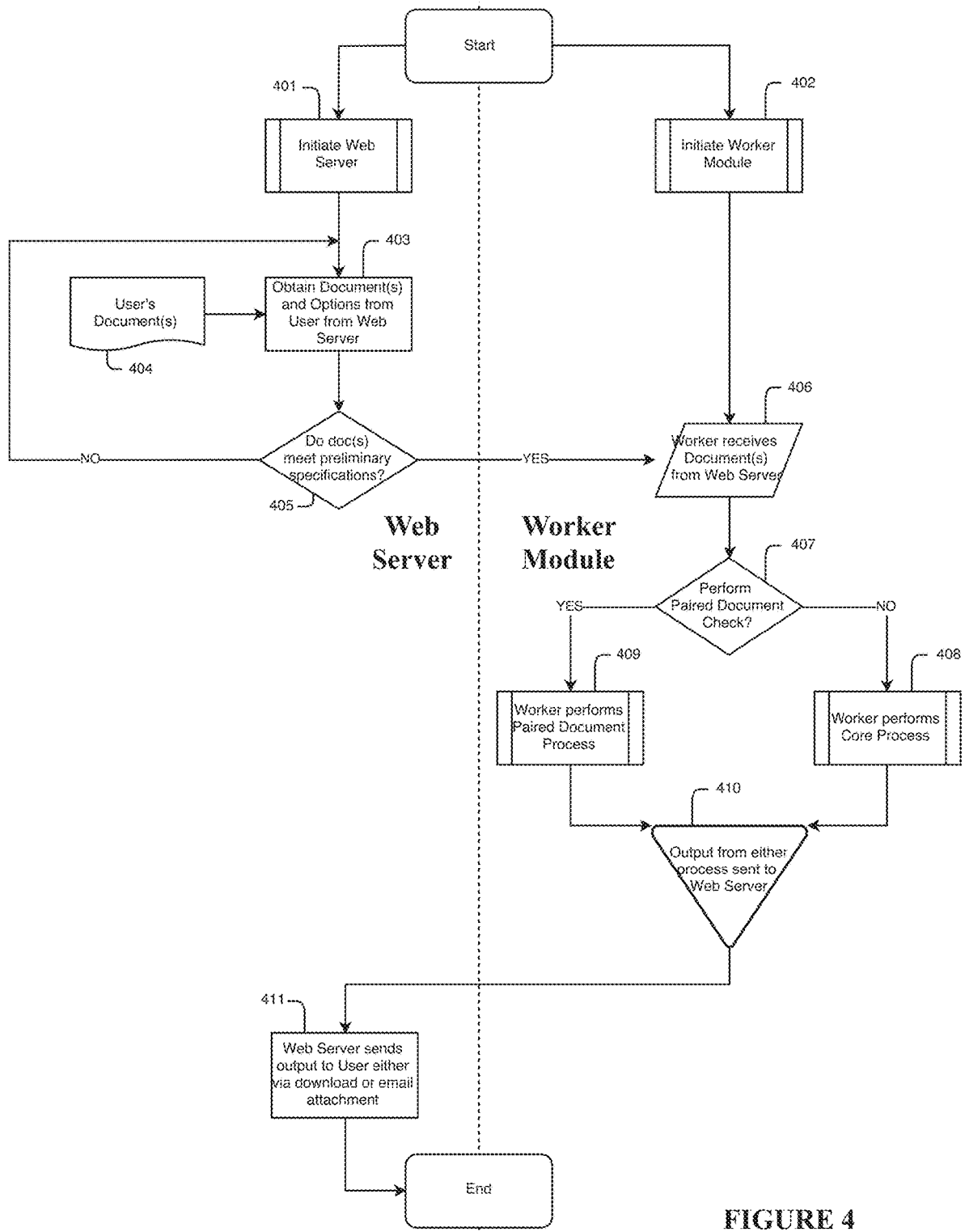
FIG. 4 is a flowchart depicting a non-limiting example of the core process and the paired document check in a web application context, with the components being bifurcated into a web server for interacting with the users and the worker module, which interacts with the web server for required input and performs core process or the paired document check, as appropriate.

In addition to the downloadable embodiments of a word processing program add-on as depicted in FIG. 2 and a downloadable standalone program depicted in the screenshot 700 shown in FIG. 7, the core process may be embodied in a non-downloadable web application, which non-limiting process flow is described in FIG. 4 and screenshots thereof shown in FIGS. 5A to 5C. The diagram of physical computers in relation to the user's computer is shown in FIG. 6.

In a typical web application that demands high CPU load, the application may be bifurcated into two components, a web server 401 (also depicted as 606), which interacts with the user via the Internet or intranet to obtain requisite information and documents, and a worker computer with an application program interface (API) 402 (also depicted as 610), which interacts with the web server and contains the modules for the core process described in FIGS. 1A and 1B and paired document check described in FIGS. 3A and 3B.

A separate database component 608, which may or may not exist in a web application embodiment, has been omitted in the process flowchart in FIG. 4 for simplicity, but is depicted in the physical diagram in FIG. 6. In absence of a database 608, various data can be stored in a simple text file, comma separated values (CSV) file or other file formats capable of storing data, which would be accessible to the worker module 402 (also depicted as 610). The key difference between FIG. 4 and FIG. 6 is that FIG. 4 describes the linear logical steps taken in relation to the other processes described supra, whereas FIG. 6 describes the non-linear physical movement of data among various components of the web application.

FIG. 5A shows a graphic representation of the web page 500 designed to obtain document(s) 404 to be uploaded and analyzed at block 403, together with options relevant to the check, such as whether the yellow highlight procedure should be performed at block 126 or 326, the method of delivery (download or email attachment) to be used at block 134 or 334 and the format of the resulting report 135 or 335 (DOCX or PDF).

At block 405, the web server performs a preliminary specifications check described supra with respect to block 103 and upon successful completion, uploads to the worker module 402, and at block 407, depending on whether the user desires to perform the core process check on a single document or the paired document check, requests the appropriate process to be called by the worker module at blocks 408 and 409 respectively. If the preliminary specification check at block 405 fails, the web server displays an appropriate error and awaits for a new set of documents and instructions from the user.

At block 408, the core process described under FIGS. 1A and 1B is performed and at block 409, the paired document check described under FIGS. 3A and 3B is performed. During the process, the progress meter 501 is shown in the web application exemplary embodiment (without actual visualization of the highlighting process shown in the Microsoft® Word® Add-on exemplary embodiment, which are shown in FIGS. 2A to 2H), which is shown as FIG. 5B.

Figure 5D:
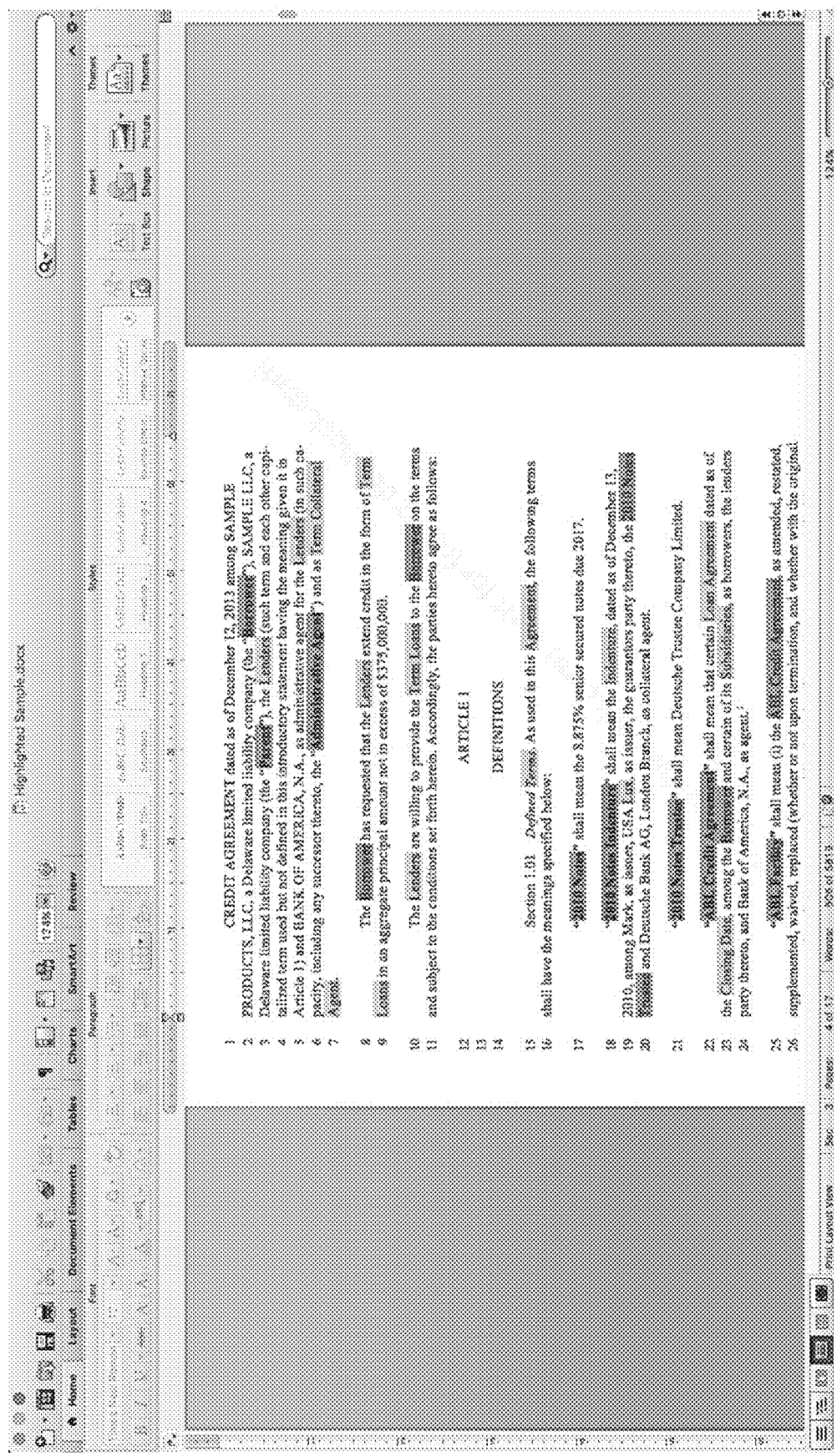

Block 410 corresponds with FIG. 5C, which shows the screenshot upon the completion of either 408 or 409 process above, displaying the statistics 502 relating to the performed process and other ancillary information. At block 411, the finished report is made available to the user in a manner specified by user at block 403, which is depicted in the screenshot 503 shown in FIG. 5D.

To illustrate the web application information flow, the web server 606, which communicates via network connection 607 with the database 608, may compare a user's authentication credentials with the user's input and upon satisfactory authentication, permits the user to upload the document(s) to be processed. When the user uploads the document(s) and begins either the core process at 408 or the paired document check at 409, the web server 606 transmits the document(s) to the worker module 610 via network connection 611. In performing either of the processes, the worker module 610 may communicate with the database 608 for the entities list, ignore list and variant list described supra, in blocks 110, 112 and 120 respectively. Upon completion of the process, the worker module 610 transmits output statistics described at block 410 to the database 608, which is then relayed to the web server 606 and the worker module 610 also transmits the highlighted document 135 to the web server 606, which is then transmitted by the web server 606 to the user's computer 601, which is represented by block 411 in the FIG. 4.

The invention claimed is:

1. A computer-implemented method for identifying terms in a document, the method being performed by one or more processors, comprising:
   electronically obtaining a user document having a plurality of title cased terms and a plurality of defined terms;
   determining whether the user document meets acceptance criteria, wherein the acceptance criteria include determining whether the user document is one or more of: password protected, encrypted, or corrupted;
   determining a location of each title cased term;
   accessing a library stored in a data repository, wherein the library includes predetermined terms not to be identified by a predetermined identifier, wherein the library includes an entities list and an ignore list;

comparing the plurality of title cased terms to the library of predetermined terms, wherein a first title cased term is classified by a first predetermined identifier if the first title cased term is not in the library, and wherein the first title cased term is not classified by the first predetermined identifier if the first title cased term is in the library;

identifying the plurality of defined terms within the user document based, at least in part, on a common expression, wherein the common expression is country specific and is based on a combination of regular expressions, Boolean conditions, and user-specific limitations; and determining each title cased term which is a defined term and a defined term location and a defined term frequency, wherein each defined term having a frequency value greater than one is reclassified by a second predetermined identifier and wherein each defined term having a frequency value of one is reclassified by a third predetermined identifier.

2. The method of claim 1, further comprising identifying stylistic structures in the user document using a fourth predetermined identifier, which occurs before determining, by the one or more processors, the location of each title cased term in the stored user document, and wherein the identified stylistic structures are not re-classified.

3. The method of claim 2, wherein the first, second, third, and fourth predetermined identifier are each a different highlight color.

4. The method of claim 2, further comprising identifying a location of each first word in each sentence of the user document using a fifth predetermined identifier, which occurs before determining the location of each title cased term in the stored user document.

5. The method of claim 4, further comprising removing the fourth and fifth predetermined identifiers; and generating an output document having the first, second, and third predetermined identifiers.

6. The method of claim 4, further comprising:
determining a location of lowercased terms having a defined term equivalent; and
classifying each lowercased term having the defined term equivalent using a sixth predetermined identifier.

7. The method of claim 4, wherein the fourth and fifth predetermined identifier are the same.

8. The method of claim 4, wherein the fourth and fifth predetermined identifier are different from each other.

9. The method of claim 1, further comprising storing each of the defined terms in a computer memory and forming an associative array comprising each defined term and the frequency value of each defined term.

10. The method of claim 9, further comprising generating a report including at least a set of output process statistics having the associative array.

11. The method of claim 1, further comprising identifying one or more variants of each defined term, and wherein the frequency value of each defined term includes the one or more variants.

12. The method of claim 1, further comprising:
notifying the user of non-acceptance of the user document if the acceptance criteria are not met and proceeding with the step of determining the location of each title cased term if the acceptance criteria are met.

13. The method of claim 1, further comprising electronically obtaining a source document configured to provide a set of defined terms to be located in the user document.

14. A computer-implemented method for identifying terms in a document, the method being performed by one or more processors, comprising:
electronically obtaining a source document having a plurality of title cased terms and a plurality of defined terms;
determining whether the source document meets acceptance criteria, wherein the acceptance criteria include determining whether the source document is one or more of: password protected, encrypted, or corrupted;
duplicating the source document to create a target document;
determining a location of each title cased term in the source document;
accessing a library stored in a data repository, wherein the library includes predetermined terms not to be identified by a predetermined identifier, wherein the library includes an entities list and an ignore list;
comparing the plurality of title cased terms to the library of predetermined terms, wherein a first title cased term is classified by a first predetermined identifier in the target document if the first title cased term is not in the library, and wherein the first title cased term in the target document is not classified by the first predetermined identifier if the first title cased term is in the library;
identifying the plurality of defined terms within the target document and the source document based, at least in part, on a common expression, wherein the common expression is country specific and is based on a combination of regular expressions, Boolean conditions, and user-specific limitations; and
determining each title cased term in the target document which is a defined term and a location and a frequency of each defined term in the target document and the source document, wherein each defined term in the target document having a frequency value greater than one is reclassified by a second predetermined identifier in the target document and wherein each defined term in the target document having a frequency value of one is reclassified by a third predetermined identifier in the target document.

15. The method of claim 14, further comprising identifying one or more variants of each defined term, and wherein the frequency value of each defined term includes the one or more variants.

16. The method of claim 14, further comprising notifying the user of non-acceptance of the target document and the source document if the acceptance criteria are not met and proceeding with the step of determining the location of each title cased term if the acceptance criteria are met.

17. The method of claim 16, further comprising terminating the method with an error message when the target document and the source document do not meet acceptance criteria.

18. The method of claim 14, further comprising storing each of the defined terms in a computer memory and forming an associative array comprising each defined term and the frequency value of each defined term.

19. The method of claim 18, further comprising generating a report including at least a set of output process statistics having the associative array.

* * * * *